United States Patent
Lin et al.

(10) Patent No.: US 10,264,444 B2
(45) Date of Patent: Apr. 16, 2019

(54) FEATURE CONFIGURATION APPARATUS AND METHOD

(71) Applicant: Huawei Technologies Co., Ltd., Shenzhen (CN)

(72) Inventors: Nizhong Lin, Shanghai (CN); Jun Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 215 days.

(21) Appl. No.: 15/448,116

(22) Filed: Mar. 2, 2017

(65) Prior Publication Data

US 2017/0180981 A1    Jun. 22, 2017

Related U.S. Application Data

(63) Continuation of application No. PCT/CN2014/085883, filed on Sep. 3, 2014.

(51) Int. Cl.
*H04W 8/22*     (2009.01)
*H04W 24/10*    (2009.01)
(Continued)

(52) U.S. Cl.
CPC ............ *H04W 8/22* (2013.01); *H04W 8/245* (2013.01); *H04W 24/02* (2013.01); *H04W 24/10* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 8,718,695 B2* | 5/2014 | Peisa ................. | H04W 52/0225 455/522 |
| 2008/0182594 A1* | 7/2008 | Flore .................... | H04W 76/27 455/458 |

(Continued)

FOREIGN PATENT DOCUMENTS

| | | |
|---|---|---|
| CN | 102932857 A | 2/2013 |
| CN | 103024802 A | 4/2013 |

(Continued)

OTHER PUBLICATIONS

"3rd Generation Partnership Project; Technical Specification Group Radio Access Network; Radio Resource Control (RRC); Protocol Specification (Release 8)," 3GPP TS 25.331 V8.25.0, Jun. 2014, 1728 pages.

(Continued)

*Primary Examiner* — Jamaal R Henson
(74) *Attorney, Agent, or Firm* — Slater Matsil, LLP

(57) ABSTRACT

A feature configuration apparatus including an indication configured to send a first reservation indication of a configuration information element to user equipment (UE), where the first reservation indication instructs the UE to reserve the configuration information element saved in a first radio resource control connection state, and an enable unit configured to, when the UE reenters the first radio resource control connection state, send a first enable indication of the configuration information element to the UE, where the first enable indication is used to instruct the UE to use the configuration information element to perform feature configuration.

20 Claims, 10 Drawing Sheets

(51) Int. Cl.
*H04W 76/27* (2018.01)
*H04W 24/02* (2009.01)
*H04W 8/24* (2009.01)

(56) References Cited

U.S. PATENT DOCUMENTS

2014/0177449 A1  6/2014  Novak et al.
2014/0321406 A1* 10/2014  Marinier ............... H04B 7/024
                                                        370/329
2015/0319744 A1  11/2015  Jung et al.

FOREIGN PATENT DOCUMENTS

| CN | 103178938 A | 6/2013 |
|---|---|---|
| EP | 2056538 A1 | 5/2009 |
| WO | 2008076991 A2 | 6/2008 |
| WO | 2011060997 A1 | 5/2011 |
| WO | 2013041035 A1 | 3/2013 |
| WO | 2014084675 A1 | 6/2014 |

OTHER PUBLICATIONS

"3rd Generation Partnership Project; Technical Specification Group Radio Access Network; Universal Terrestrial Radio Access Network (UTRAN); General description; Stage 2 (Release 12)," 3GPP TS 25.300 V12.1.0, Jun. 2014, 7 pages.

"3rd Generation Partnership Project; Technical Specification Group Radio Access Network; Radio Resource Control (RRC); Protocol specification (Release 12)," 3GPP TS 25.331 V12.2.0, Jun. 2014, 2140 pages.

"3rd Generation Partnership Project; Technical Specification Group Radio Access Network; UTRAN Iub interface Node B Application Part (NBAP) Signalling (Release 12)," 3GPP TS 25.433 V12.1.0 , Jun. 2014, 1351 pages.

* cited by examiner

FEATURE CONFIGURATION APPARATUS AND METHOD

CROSS-REFERENCE TO RELATED APPLICATIONS

This application is a continuation of International Application No. PCT/CN2014/085883, filed on Sep. 3, 2014, the disclosure of which is hereby incorporated by reference in its entirety.

TECHNICAL FIELD

The present invention relates to the field of mobile communications, and in particular, to a feature configuration apparatus and method.

BACKGROUND

In a universal mobile telecommunications system (UMTS), a radio resource control (RRC) connection state of user equipment (UE) includes a cell_dedicated channel (CELL_DCH) state, a cell_forward access channel (CELL_FACH) state, a cell_paging channel (CELL_PCH) state, and a UTRAN registration area paging channel (URA_PCH) state. CELL_DCH refers to that the UE is in an active state, the UE is using a dedicated channel of the UE to perform communication, both an uplink and a downlink have dedicated channels, and a network accurately knows a cell in which the user equipment is located. CELL_FACH refers to that the UE is in an active state, but both an uplink and a downlink have only a small amount of data that needs to be transmitted, and a network accurately knows a cell in which the UE is located. CELL_PCH refers to that neither an uplink nor a downlink of the UE has data to transfer, a paging indicator channel (PICH) needs to be listened on, so as to listen to paging, and the UE enters discontinuous reception in this case; therefore, power may be effectively saved, a network accurately knows a cell in which the UE is located, and after the cell in which the UE is located is changed, the network needs to update cell information of the UE. URA_PCH refers to that neither an uplink nor a downlink of the UE has data to transfer, a PICH needs to be listened on, the UE enters discontinuous reception, a network knows only a UTRAN registration area (URA) in which the UE is located, that is, the network updates location information of the UE only after a URA in which the UE is located is changed, thereby reducing resources and reducing signaling.

In a different RRC connection state, UE has a different data transmission capability and occupies a different communication resource. As a data transmission requirement changes, an RRC connection state of the UE needs to be switched among CELL_DCH, CELL_FACH, CELL_PCH, and URA_PCH, thereby achieving an objective of both meeting the data transmission requirement of the UE and reducing communication resources. For example, when the UE needs to send a large amount of data, a network instructs, by using downlink RRC signaling, the UE to enter CELL_DCH. When the UE needs to transmit only a small amount of data, the network may instruct, by using downlink RRC signaling, the UE to enter CELL_FACH. If the UE does not need to send data, the network may instruct, by using downlink RRC signaling, the UE to enter CELL_PCH.

In a different RRC connection state, a feature that can be enabled by UE is also different. Therefore, if a state of the UE transitions, a network further needs to configure a feature. The feature that can be enabled by the UE refers to a technical capability that is enabled by the UE and that can be supported by the UE. The technical capability is, for example, a high speed downlink packet access (HSDPA) capability, a dual-carrier high speed downlink packet access (DC-HSDPA) capability, a high speed uplink packet access (HSUPA) capability, a discontinuous transmission/discontinuous reception (DTX/DRX) capability, a four-carrier high speed downlink packet access (4C-HSDPAs) capability, or a dual-carrier high speed uplink packet access (DC-HSUPA) capability. In the prior art, if a feature to be activated needs to be activated, a network needs to add, to signaling sent to the UE, a configuration information element corresponding to the feature to be enabled. The configuration information element includes a configuration parameter needed to configure the feature to be enabled. For example, when the RRC connection state of the UE is transitioned to CELL_DCH, to improve a data transmission rate of the UE, the network may turn on multiple carriers. The multiple carriers refer to a feature of configuring multiple adjacent or nonadjacent carriers for the UE to improve the data transmission rate of the UE. When the UE needs to turn on multiple carriers, the network adds, to signaling sent to the UE, a configuration information element that corresponds to turning on of multiple carriers. When receiving the configuration information element, the UE performs configuration according to the configuration information element, to turn on multiple carriers.

The inventor finds that, when an existing feature configuration method is used, even if content of a configuration information element is not changed, each time UE needs to activate a feature to be activated, a network needs to send the configuration information element to the UE. Using an example of enabling a multiple-carrier feature having a same configuration parameter, each time a state of the UE is transitioned to CELL_DCH, a radio network controller needs to send a same configuration information element to the UE. It may be seen accordingly that when the existing feature configuration method is used, a same configuration information element is repetitively sent, which causes a waste of signaling resources, and reduces a success rate of signaling transmission of an air interface.

SUMMARY

Embodiments provide a feature configuration apparatus and method, so as to resolve a problem that a waste of signaling resources is caused and a success rate of signaling transmission of an air interface is reduced when an existing feature configuration method is used.

According to a first aspect, an embodiment provides a feature configuration apparatus, including an indication unit, configured to send a first reservation indication of a configuration information element to user equipment (UE), where the first reservation indication is used to instruct the UE to reserve the configuration information element saved in a first radio resource control connection state; and an enable unit, configured to: when the UE reenters the first radio resource control connection state, send a first enable indication of the configuration information element to the UE, where the first enable indication is used to instruct the UE to use the configuration information element to perform feature configuration.

With reference to the first aspect, in a first possible implementation manner of the first aspect, the indication unit is further configured to send a second reservation indication of the configuration information element to a base station, where the second reservation indication is used to instruct the base station to reserve the configuration information element saved in the first radio resource control connection state; and the enable unit is further configured to: when the UE reenters the first radio resource control connection state, send a second enable indication of the configuration information element to the base station, where the second enable indication is used to instruct the base station to use the configuration information element to perform feature configuration.

With reference to the first possible implementation manner of the first aspect, in a second possible implementation manner of the first aspect, the indication unit is further configured to send the second reservation indication or the second enable indication to the base station by using a radio link setup message or a radio link reconfiguration message.

With reference to the first possible implementation manner of the first aspect or a second possible implementation manner of the first aspect, in a third possible implementation manner of the first aspect, the indication unit is further configured to: at an initial feature configuration stage or when the UE leaves the first radio resource control connection state, send the second reservation indication to the base station.

With reference to any one of the first aspect or the first possible implementation manner of the first aspect to the third possible implementation manners of the first aspect, in a fourth possible implementation manner of the first aspect, the second reservation indication carries a label for labeling the first radio resource control connection state.

With reference to any one of the first possible implementation manner of the first aspect to the fourth possible implementation manners of the first aspect, in a fifth possible implementation manner of the first aspect, the second reservation indication includes a first bit string, each bit in the first bit string corresponds to one configuration information element saved in the first radio resource control connection state, and a value of a bit is used to represent whether a configuration information element corresponding to the bit needs to be reserved; or the second reservation indication includes reservation indications of one or more sub-configuration information elements, and a reservation indication of each sub-configuration information element corresponds to one configuration information element that needs to be reserved, or the second reservation indication includes a reservation identifier, and the reservation identifier represents that all the saved configuration information elements need to be reserved.

With reference to any one of the first to the fifth possible implementation manners of the first aspect, in a sixth possible implementation manner of the first aspect, the receiving unit is further configured to receive a second signaling overhead optimization capability report reported by the base station, where the second signaling overhead optimization capability report is used to report that the base station has a capability of reserving the configuration information element saved in the first radio resource control connection state.

With reference to any one of the first aspect or the first to the sixth possible implementation manners of the first aspect, in a seventh possible implementation manner of the first aspect, the indication unit is further configured to send the first reservation indication or the first enable indication to the UE by using a radio bearer setup message or a radio bearer reconfiguration message.

With reference to any one of the first aspect or the first to the seventh possible implementation manners of the first aspect, in an eighth possible implementation manner of the first aspect, the indication unit is further configured to: at an initial feature configuration stage or when the UE leaves the first radio resource control connection state, send the first reservation indication to the UE.

With reference to any one of the first aspect or the first to the eighth possible implementation manners of the first aspect, in a ninth possible implementation manner of the first aspect, the first reservation indication carries a label for labeling the first radio resource control connection state.

With reference to any one of the first aspect or the first to the ninth possible implementation manners of the first aspect, in a tenth possible implementation manner of the first aspect, the first reservation indication includes a second bit string, each bit in the second bit string corresponds to one configuration information element saved in the first radio resource control connection state, and a value of a bit is used to represent whether a configuration information element corresponds to the bit needs to be reserved; or the first reservation indication includes reservation indications of one or more sub-configuration information elements, and a reservation indication of each sub-configuration information element corresponds to one configuration information element that needs to be reserved; or the first reservation indication includes a reservation identifier, and the reservation identifier represents that all the saved configuration information elements need to be reserved.

With reference to any one of the first aspect or the first to the tenth possible implementation manners of the first aspect, in an eleventh possible implementation manner of the first aspect, the apparatus further includes: a receiving unit, configured to receive a first signaling overhead optimization capability report reported by the UE, where the first signaling overhead optimization capability report is used to report that the UE has a capability of reserving the configuration information element saved in the first radio resource control connection state.

With reference to any one of the first to the fifth possible implementation manners of the first aspect, in a twelfth possible implementation manner of the first aspect, the second enable indication includes a third bit string, each bit in the third bit string corresponds to one configuration information element, and a value of each bit is used to represent whether the saved configuration information element corresponding to the bit needs to be used to perform feature configuration, or the second enable indication includes enable indications of one or more sub-configuration information elements, and an enable indication of each sub-configuration information element corresponds to one configuration information element, and is used to represent that the configuration information element corresponding to the enable indication of the sub-configuration information element needs to be used to perform feature configuration, or the second enable indication includes an enable identifier, and the enable identifier represents that all the reserved configuration information elements need to be used to perform feature configuration.

With reference to any one of the first aspect or the first to the twelfth possible implementation manners of the first aspect, in a thirteenth possible implementation manner of the first aspect, the first enable indication includes a fourth bit string, each bit in the fourth bit string corresponds to one configuration information element, and a value of each bit is used to represent whether the saved configuration information element corresponding to the bit needs to be used to perform feature configuration, or the first enable indication includes enable indications of one or more sub-configuration information elements, and an enable indication of each sub-configuration information element corresponds to one configuration information element, and is used to represent that the configuration information element corresponding to the enable indication of the sub-configuration information element needs to be used to perform feature configuration; or the first enable indication includes an enable identifier, and the enable identifier represents that all the reserved configuration information elements need to be used to perform feature configuration.

With reference to any one of the first aspect or the first to the thirteenth possible implementation manners of the first aspect, in a fourteenth possible implementation manner of the first aspect, the first radio resource control connection state is any one of a cell_dedicated channel (CELL_DCH) state, a cell_paging channel (CELL_PCH) state, a cell_forward access channel (CELL_FACH) state or a UTRAN registration area paging channel (URA_PCH) state.

According to a second aspect, an embodiment provides a feature configuration apparatus, including: a receiving unit, configured to receive a first signaling overhead optimization capability report reported by user equipment (UE), where the first signaling overhead optimization capability report is used to report that the UE has a capability of reserving the configuration information element saved in a first radio resource control connection state, an indication unit, configured to send the configuration information element to the UE, so that the UE reserves the configuration information element when leaving the first radio resource control connection state, and an enable unit, configured to, when the UE reenters the first radio resource control connection state, send a first enable indication of the configuration information element to the UE, where the first enable indication is used to instruct the UE to use the configuration information element to perform feature configuration.

With reference to the second aspect, in a first possible implementation manner of the second aspect, the receiving unit is further configured to receive a second signaling overhead optimization capability report reported by a base station, where the second signaling overhead optimization capability report is used to report that the base station has a capability of reserving the configuration information element saved in the first radio resource control connection state. The indication unit is further configured to send the configuration information element to the base station, so that the base station reserves the configuration information element, and the enable unit is further configured to, when the UE reenters the first radio resource control connection state, send a second enable indication of the configuration information element to the base station, where the second enable indication is used to instruct the base station to use the configuration information element to perform feature configuration.

With reference to the first possible implementation manner of the second aspect, in a second possible implementation manner of the second aspect, the second enable indication includes a first bit string, each bit in the first bit string corresponds to one configuration information element, and a value of each bit is used to represent whether the saved configuration information element corresponding to the bit needs to be used to perform feature configuration, or the second enable indication includes enable indications of one or more sub-configuration information elements, and an enable indication of each sub-configuration information element corresponds to one configuration information element, and represents that a saved configuration information element corresponding to the enable indication of the sub-configuration information element needs to be used to perform feature configuration; or the second enable indication includes an enable identifier, and the enable identifier represents that all the reserved configuration information elements need to be used to perform feature configuration.

With reference to the second aspect or the first possible implementation manner of the second aspect, in a third possible implementation manner of the second aspect, the first enable indication includes a second bit string, each bit in the second bit string corresponds to one configuration information element, and a value of each bit is used to represent whether the saved configuration information element corresponding to the bit needs to be used to perform feature configuration; or the first enable indication includes enable indications of one or more sub-configuration information elements, and an enable indication of each sub-configuration information element corresponds to one configuration information element, and represents that a saved configuration information element corresponding to the enable indication of the sub-configuration information element needs to be used to perform feature configuration; or the first enable indication includes an enable identifier, and the enable identifier represents that all the reserved configuration information elements need to be used to perform feature configuration.

According to a third aspect, an embodiment provides a feature configuration apparatus, including: a receiving unit, configured to receive a reservation indication of a configuration information element and an enable indication of the configuration information element, where the reservation indication and the enable indication are sent by a radio network controller (RNC), the reservation indication is used to instruct a wireless communications device to reserve the configuration information element saved in a first radio resource control connection state, and the enable indication is used to instruct the wireless communications device to use the configuration information element to perform feature configuration, where the receiving unit is further configured to receive the configuration information element, a saving unit, configured to reserve the configuration information element, a determining unit, configured to, when the enable indication is received, determine, according to the enable indication and the reserved configuration information element, a configuration information element to be enabled, and an enable unit, configured to use the configuration information element to be enabled to perform feature configuration.

With reference to the third aspect, in a first possible implementation manner of the third aspect, the reservation indication includes a first bit string, each bit in the first bit string corresponds to one configuration information element saved in the first radio resource control connection state, and a value of a bit is used to represent whether a configuration information element corresponding to the bit needs to be reserved, or the reservation indication includes reservation indications of one or more sub-configuration information elements, and a reservation indication of each sub-configuration information element corresponds to one configuration information element that needs to be reserved, or the reservation indication includes a reservation identifier, and the reservation identifier represents that all the saved configuration information elements need to be reserved.

With reference to the third aspect or the first possible implementation manner of the third aspect, in a second possible implementation manner of the third aspect, the determining unit is further configured to: when the enable indication includes a second bit string, use a configuration information element corresponding to a bit, whose bit value is a specific value, in the second bit string as the configuration information element to be enabled; or when the enable indication includes an enable indication of a sub-configuration information element, use, as the configuration information element to be enabled, a configuration information element indicated by an enable indication of each sub-configuration information element is used as the configuration information element to be enabled, or when the enable indication includes an enable identifier, use, as the configuration information element to be enabled, all the configuration information elements that are reserved by the wireless communications device in the first radio resource control connection state are used as the configuration information element to be enabled.

According to a fourth aspect, an embodiment provides a feature configuration apparatus, including a sending unit, configured to send a signaling overhead optimization capability report to a radio network controller (RNC), where the signaling overhead optimization capability report is used to report that a wireless communications device has a capability of reserving a configuration information element saved in a first radio resource control connection state, a receiving unit, configured to receive the configuration information element sent by the RNC, a saving unit, configured to reserve the configuration information element, where the receiving unit is further configured to receive an enable indication of the configuration information element sent by the RNC, a determining unit, configured to, when the receiving unit receives the enable indication, determine, according to the enable indication and the reserved configuration information element, a configuration information element to be enabled, and a configuration unit, configured to use the configuration information element that is to be enabled and that is determined by the determining unit to perform feature configuration.

With reference to the fourth aspect, in a first possible implementation manner of the fourth aspect, the determining unit is further configured to, when the enable indication includes a second bit string, use a configuration information element corresponding to a bit, whose bit value is a specific value, in the second bit string as the configuration information element to be enabled; or when the enable indication includes an enable indication of a sub-configuration information element, use, as the configuration information element to be enabled, a configuration information element indicated by an enable indication of each sub-configuration information element, or when the enable indication includes an enable identifier, use, as the configuration information element to be enabled, all the configuration information elements that are reserved by the wireless communications device in the first radio resource control connection state.

According to a fifth aspect, an embodiment provides a feature configuration method, including sending, by a radio network controller (RNC), a first reservation indication of a configuration information element to user equipment (UE), where the first reservation indication is used to instruct the UE to reserve the configuration information element saved in a first radio resource control connection state, and, when the UE reenters the first radio resource control connection state, sending, by the RNC, a first enable indication of the configuration information element to the UE, where the first enable indication is used to instruct the UE to use the saved configuration information element to perform feature configuration.

With reference to the fifth aspect, in a first possible implementation manner of the fifth aspect, the RNC sends a second reservation indication of the configuration information element to a base station, where the second reservation indication is used to instruct the base station to reserve the configuration information element saved in the first radio resource control connection state, and when the UE reenters the first radio resource control connection state, the RNC sends a second enable indication of the configuration information element to the base station, where the second enable indication is used to instruct the base station to use the saved configuration information element to perform feature configuration.

With reference to the first possible implementation manner of the fifth aspect, in a second possible implementation manner of the fifth aspect, the RNC sends the second reservation indication or the second enable indication to the base station by using a radio link setup message or a radio link reconfiguration message.

With reference to the first possible implementation manner of the fifth aspect or the second possible implementation manner of the fifth aspect, in a third possible implementation manner of the fifth aspect, at an initial feature configuration stage or when the UE leaves the first radio resource control connection state, the RNC sends the second reservation indication to the base station.

With reference to any one of the first to the third possible implementation manners of the fifth aspect, in a fourth possible implementation manner of the fifth aspect, the second reservation indication carries a label for labeling the first radio resource control connection state.

With reference to any one of the first to the fourth possible implementation manners of the fifth aspect, in a fifth possible implementation manner of the fifth aspect, the second reservation indication includes a first bit string, each bit in the first bit string corresponds to one configuration information element saved in the first radio resource control connection state, and a value of a bit is used to represent whether a configuration information element corresponding to the bit needs to be reserved, or the second reservation indication includes reservation indications of one or more sub-configuration information elements, and a reservation indication of each sub-configuration information element corresponds to one configuration information element that needs to be reserved; or the second reservation indication includes a reservation identifier, and the reservation identifier represents that all the saved configuration information elements need to be reserved.

With reference to any one of the first to the fifth possible implementation manners of the fifth aspect, in a sixth possible implementation manner of the fifth aspect, before the sending, by the RNC, a second reservation indication of the configuration information element to a base station, the method further includes: receiving, by the radio network controller, a second signaling overhead optimization capability report reported by the base station, where the second signaling overhead optimization capability report is used to report that the base station has a capability of reserving the configuration information element saved in the first radio resource control connection state.

With reference to any one of the fifth aspect or the first to the sixth possible implementation manners of the fifth aspect, in a seventh possible implementation manner of the fifth aspect, the RNC sends the first reservation indication or the first enable indication to the UE by using a radio bearer setup message or a radio bearer reconfiguration message.

With reference to any one of the fifth aspect or the first to the seventh possible implementation manners of the fifth aspect, in an eighth possible implementation manner of the fifth aspect, at an initial feature configuration stage or when the UE leaves the first radio resource control connection state, the RNC sends the first reservation indication to the UE.

With reference to any one of the fifth aspect or the first to the eighth possible implementation manners of the fifth aspect, in a ninth possible implementation manner of the fifth aspect, the first reservation indication carries a label for labeling the first radio resource control connection state.

With reference to any one of the fifth aspect or the first to the ninth possible implementation manners of the fifth aspect, in a tenth possible implementation manner of the fifth aspect, the first reservation indication includes a second bit string, each bit in the second bit string corresponds to one configuration information element saved in the first radio resource control connection state, and a value of a bit is used to represent whether a configuration information element corresponding to the bit needs to be reserved; or the first reservation indication includes reservation indications of one or more sub-configuration information elements, and a reservation indication of each sub-configuration information element corresponds to one configuration information element that needs to be reserved; or the first reservation indication includes a reservation identifier, and the reservation identifier represents that all the saved configuration information elements need to be reserved.

With reference to any one of the fifth aspect or the first to the tenth possible implementation manners of the fifth aspect, in an eleventh possible implementation manner of the fifth aspect, before the sending, by an RNC, a reservation indication of a configuration information element to user equipment (UE), the method further includes receiving, by the radio network controller, a first signaling overhead optimization capability report reported by the UE, where the first signaling overhead optimization capability report is used to report that the UE has a capability of reserving, by the UE, the configuration information element saved in the first radio resource control connection state.

With reference to any one of the first to the eleventh possible implementation manners of the fifth aspect, in a twelfth possible implementation manner of the fifth aspect, the second enable indication includes a third bit string, each bit in the third bit string corresponds to one configuration information element, and a value of each bit is used to represent whether the saved configuration information element corresponding to the bit needs to be used to perform feature configuration; or the second enable indication includes enable indications of one or more sub-configuration information elements, and an enable indication of each sub-configuration information element corresponds to one configuration information element, and is used to represent that the configuration information element corresponding to the enable indication of the sub-configuration information element needs to be used to perform feature configuration; or the second enable indication includes an enable identifier, and the enable identifier represents that all the reserved configuration information elements need to be used to perform feature configuration.

With reference to any one of the fifth aspect or the first to the twelfth possible implementation manners of the fifth aspect, in a thirteenth possible implementation manner of the fifth aspect, the first enable indication includes a fourth bit string, each bit in the fourth bit string corresponds to one configuration information element, and a value of each bit is used to represent whether the saved configuration information element corresponding to the bit needs to be used to perform feature configuration, or the first enable indication includes enable indications of one or more sub-configuration information elements, and an enable indication of each sub-configuration information element corresponds to one configuration information element, and is used to represent that the configuration information element corresponding to the enable indication of the sub-configuration information element needs to be used to perform feature configuration; or the first enable indication includes an enable identifier, and the enable identifier represents that all the reserved configuration information elements need to be used to perform feature configuration.

With reference to any one of the fifth aspect or the first to the thirteenth possible implementation manners of the fifth aspect, in a fourteenth possible implementation manner of the fifth aspect, the first radio resource control connection state is any one of a cell_dedicated channel (CELL_DCH) state, a cell_paging channel (CELL_PCH) state, a cell_forward access channel (CELL_FACH) state, or a UTRAN registration area paging channel (URA_PCH) state.

According to a sixth aspect, an embodiment provides a feature configuration method, including: receiving, by a radio network controller (RNC), a first signaling overhead optimization capability report reported by user equipment (UE), where the first signaling overhead optimization capability report is used to report that the UE has a capability of reserving a configuration information element saved in a first radio resource control connection state, after receiving the first signaling overhead optimization capability report, sending, by the RNC, the configuration information element to the UE, so that the UE reserves the configuration information element when leaving the first radio resource control connection state; and when the UE reenters the first radio resource control connection state, sending, by the RNC, a first enable indication of the configuration information element to the UE, where the first enable indication is used to instruct the UE to use the configuration information element to perform feature configuration.

With reference to the sixth aspect, in a first possible implementation manner of the sixth aspect, the RNC receives a second signaling overhead optimization capability report reported by a base station, where the second signaling overhead optimization capability report is used to report that the base station has a capability of reserving the configuration information element saved in the first radio resource control connection state; after receiving the second signaling overhead optimization capability report, the RNC sends the configuration information element to the base station, so that the base station reserves the configuration information element; and when the UE reenters the first radio resource control connection state, the RNC sends a second enable indication of the configuration information element to the base station, where the second enable indication is used to instruct the base station to use the configuration information element to perform feature configuration.

With reference to the first possible implementation manner of the sixth aspect, in a second possible implementation manner of the sixth aspect, the second enable indication includes a first bit string, each bit in the first bit string corresponds to one configuration information element, and a value of each bit is used to represent whether the saved configuration information element corresponding to the bit needs to be used to perform feature configuration; or the second enable indication includes enable indications of one or more sub-configuration information elements, and an enable indication of each sub-configuration information element corresponds to one configuration information element, and represents that a saved configuration information element corresponding to the enable indication of the sub-configuration information element needs to be used to perform feature configuration; or the second enable indication includes an enable identifier, and the enable identifier represents that all the reserved configuration information elements need to be used to perform feature configuration.

According to a seventh aspect, an embodiment provides a feature configuration method, including receiving a reservation indication of a configuration information element and an enable indication of the configuration information element, where the reservation indication and the enable indication are sent by a radio network controller (RNC), the reservation indication is used to instruct a wireless communications device to reserve the configuration information element saved in a first radio resource control connection state, and the enable indication is used to instruct the wireless communications device to use the configuration information element to perform feature configuration; receiving the configuration information element sent by the RNC, and reserving the configuration information element. The method further includes, when the enable indication is received, determining, according to the enable indication and the reserved configuration information element, a configuration information element to be enabled, and using the configuration information element to be enabled to perform feature configuration.

With reference to the seventh aspect, in a first possible implementation manner of the seventh aspect, the reservation indication includes a first bit string, each bit in the first bit string corresponds to one configuration information element saved in the first radio resource control connection state, and a value of a bit is used to represent whether a configuration information element corresponding to the bit needs to be reserved, or the reservation indication includes reservation indications of one or more sub-configuration information elements, and a reservation indication of each sub-configuration information element corresponds to one configuration information element that needs to be reserved; or the reservation indication includes a reservation identifier, and the reservation identifier represents that all the saved configuration information elements need to be reserved.

With reference to the seventh aspect or the first possible implementation manner of the seventh aspect, in a second possible implementation manner of the seventh aspect, the determining, according to the enable indication and the reserved configuration information element, a configuration information element to be enabled includes, if the enable indication includes a second bit string, using a configuration information element corresponding to a bit, whose bit value is a specific value, in the second bit string as the configuration information element to be enabled, or if the enable indication includes an enable indication of a sub-configuration information element, using, as the configuration information element to be enabled, a configuration information element indicated by an enable indication of each sub-configuration information element, or if the enable indication includes an enable identifier, using, as the configuration information element to be enabled, all the configuration information elements that are reserved by the wireless communications device in the first radio resource control connection state.

According to an eighth aspect, an embodiment provides a feature configuration method, including sending, by a wireless communications device, a signaling overhead optimization capability report to a radio network controller (RNC), where the signaling overhead optimization capability report is used to report that the wireless communications device has a capability of reserving a configuration information element saved in a first radio resource control connection state; receiving the configuration information element sent by the RNC, and reserving the configuration information element; receiving an enable indication of the configuration information element sent by the RNC; when the enable indication is received, determining, according to the enable indication and the reserved configuration information element, a configuration information element to be enabled, and using the configuration information element to be enabled to perform feature configuration.

With reference to the eighth aspect, in a first possible implementation manner of the eighth aspect, the determining, according to the enable indication of the configuration information element and the configuration information element, a configuration information element to be enabled includes: if the enable indication includes a second bit string, using a configuration information element corresponding to a bit, whose bit value is a specific value, in the second bit string as the configuration information element to be enabled; or if the enable indication includes an enable indication of a sub-configuration information element, using, as the configuration information element to be enabled, a configuration information element indicated by an enable indication of each sub-configuration information element, or, if the enable indication includes an enable identifier, using, as the configuration information element to be enabled, all the configuration information elements that are reserved by the wireless communications device in the first radio resource control connection state.

In the embodiments, an indication unit is configured to send a reservation indication of a configuration information element to user equipment (UE), where the reservation indication of the configuration information element is used to instruct the UE to reserve, when a radio resource control connection state is transitioned, the configuration information element saved in a first radio resource control connection state, and an enable unit is configured to, when the UE reenters the first radio resource control connection state, send an enable indication of the configuration information element to the UE, where the enable indication is used to instruct the UE to use the configuration information element to perform feature configuration. By means of this embodiment, UE or UE and a base station may reserve a configuration information element according to an indication of an RNC instead of deleting the configuration information element, and when the UE or the UE and the base station need to enable a feature, the reserved configuration information element may be used according to an enable indication of the configuration information element to perform configuration, so that transmission of a configuration information element is reduced, thereby reducing signaling resources.

BRIEF DESCRIPTION OF THE DRAWINGS

To describe the technical solutions in the embodiments more clearly, the following briefly introduces the accompanying drawings required for describing the embodiments or the prior aft. Apparently, a person of ordinary skill in the art may still derive other drawings from these accompanying drawings without creative efforts.

DETAILED DESCRIPTION OF ILLUSTRATIVE EMBODIMENTS

Figure 1:
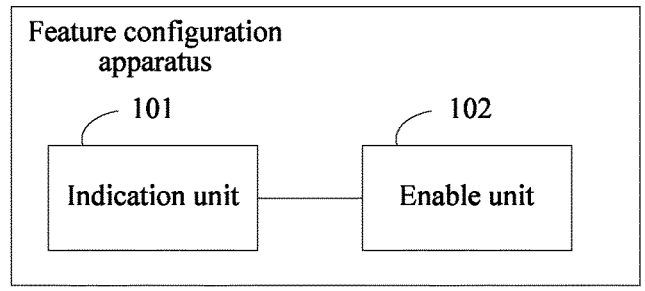
FIG. 1 is a schematic diagram of an embodiment of a feature configuration apparatus according to some embodiments.

To make a person skilled in the art understand the technical solutions in the present invention better, the following clearly describes the technical solutions in the embodiments of the present invention with reference to the accompanying drawings in the embodiments. Apparently, the described embodiments are merely a part rather than all of the embodiments. All other embodiments obtained by a person of ordinary skill in the art based on the embodiments without creative efforts shall fall within the protection scope of the present invention.

A configuration information element in the embodiments refers to an information element that includes a feature configuration parameter. Each configuration information element corresponds to one feature. UE, a base station, and a radio network controller may perform feature configuration according to a feature configuration parameter included in the configuration information element, thereby enabling a feature corresponding to the configuration information element. Therefore, to use the configuration information element to perform feature configuration in this specification is to perform feature configuration according to the feature configuration parameter included in the configuration information element.

The feature may be one or more of DC-HSDPA, HSDPA, HSUPA, DTX/DRX, 4C-HSDPA, DC-HSUPA, or the like. Specific descriptions of the foregoing features are as follows:

DC-HSDPA: a feature introduced in the 3GPP Rel-8. DC-HSDPA is a dual-carrier HSDPA technology that can improve a downlink rate in a manner of aggregating two carriers that have adjacent frequencies or that are across frequency bands. A corresponding information element in the TS 25.331 protocol is: Downlink secondary cell info FDD 10.3.6.31a. A corresponding information element in the TS 25.433 protocol is: HS-DSCH FDD Secondary Serving Information 9.2.2.18 Da.

HSDPA: a feature introduced in the 3GPP Rel-5. HSDPA is High Speed Downlink Packet Access, and can achieve a relatively high downlink rate on one carrier. A corresponding information element in the TS 25.331 protocol is: Downlink HS-PDSCH Information 10.3.6.23a. A corresponding information element in the TS 25.433 protocol is: HS-DSCH FDD Information 9.2.2.18D.

HSUPA: a feature introduced in the 3GPP Rel-6. HSUPA is High Speed Uplink Packet Access, and can achieve a relatively high uplink rate on one carrier. A corresponding information element in the TS 25.331 protocol is: E-DCH Info 10.3.6.97. A corresponding information element in the TS 25.433 protocol is: E-DCH FDD Information 9.2.2.13 Da.

DTX/DRX: a feature introduced in the 3GPP Rel-7. DTX/DRX is uplink discontinuous transmission and downlink discontinuous reception. Corresponding information elements in the TS 25.331 protocol are: DTX-DRX timing information 10.3.6.34b and DTX-DRX Information 10.3.6.34a. A corresponding information element in the TS 25.433 protocol is: Continuous Packet Connectivity DTX-DRX Information 9.2.2.66.

4C-HSDPA: a feature introduced in the 3GPP Rel-10. 4C-HSDPA is a four-carrier HSDPA technology, and can improve a downlink rate in a manner of aggregating four carriers that have adjacent frequencies or that are across frequency bands. A corresponding information element in the TS 25.331 protocol is: Downlink secondary cell info FDD 10.3.6.31a. A corresponding information element in the TS 25.433 protocol is: HS-DSCH FDD Secondary Serving Information 9.2.2.18 Da.

DC-HSUPA: a feature introduced in the 3GPP Rel-9. DC-HSUPA is a dual-carrier HSUPA technology, and may improve an uplink rate in a manner of aggregating two carriers that have adjacent frequencies. A corresponding information element in the TS 25.331 protocol is: Uplink secondary cell info FDD 10.3.6.115. A corresponding information element in the TS 25.433 protocol is: Additional E-DCH FDD Setup Information 9.2.2.131.

Referring to FIG. 1, FIG. 1 is a schematic diagram of an embodiment of a feature configuration apparatus according to some embodiments. The feature configuration apparatus may be disposed on a radio network controller, or may be a radio network controller.

As shown in FIG. 1, the apparatus includes: an indication unit 101 and an enable unit 102.

The indication unit 101 is configured to send a first reservation indication of a configuration information element to user equipment (UE), where the first reservation indication is used to instruct the UE to reserve the configuration information element saved in a first radio resource control connection state.

In a possible implementation manner, the indication unit 101 may further be configured to send a second reservation indication of the configuration information element to a base station, where the second reservation indication is used to instruct the base station to reserve the configuration information element saved in the first radio resource control connection state. The first reservation indication and the second reservation indication may be the same or may be different, which is not limited herein.

For example, the first reservation indication is used to instruct the UE to reserve, when a radio resource control connection state is transitioned, a configuration information element in the radio resource control connection state from which the UE is to leave. The second reservation indication is used to instruct the base station to reserve, when a radio resource control connection state is transitioned, the configuration information element in the radio resource control connection state from which the UE is to leave.

The indication unit 101 may send the reservation indication of the configuration information element to only the UE. In this case, the radio network controller also includes a reservation unit, configured to reserve the configuration information element. Alternatively, the indication unit 101 may send the reservation indication of the configuration information element to the UE and the base station. In this case, the radio network controller may include a reservation unit, or may not include a reservation unit. That is, it is feasible as long as that both a network and the UE reserve the configuration information element.

The first radio resource control connection state is any one of a CELL_DCH state, a CELL_PCH state, a CELL_FACH state, or a URA_PCH state.

When the UE needs to activate a feature, not only the UE needs to use a configuration information element corresponding to the feature to perform configuration, but also the base station uses the configuration information element corresponding to the feature to perform configuration.

To enable the UE or the base station to reuse the configuration information element saved in the first radio resource control connection state to perform feature configuration, first, the UE or the UE and the base station need to be instructed to reserve, when a radio resource control connection state is transitioned, the configuration information element saved in the first radio resource control connection state instead of deleting the configuration information element.

In a possible implementation manner, the indication unit 101 may send the first reservation indication to the UE when the UE enters the first radio resource control connection state for the first time or reenters the first radio resource control connection state or is in the first radio resource control connection state, and further, send the second reservation indication to the base station when the UE enters the first radio resource control connection state for the first time or reenters the first radio resource control connection state or is in the first radio resource control connection state.

In another possible implementation manner, the indication unit 101 may also send the first reservation indication to the UE when a radio resource control connection state of the UE is transitioned, that is, when the UE is transitioned from the first radio resource control connection state to a second radio resource control connection state, and further, send the second reservation indication to the base station when a radio resource control connection state of the UE is transitioned.

The first radio resource control connection state is a radio resource control connection state of the UE before the radio resource control connection state of the UE is transitioned. The second radio resource control connection state is a radio resource control connection state after the radio resource control connection state of the UE is transitioned, and the second radio resource control connection state is different from the first radio resource control connection state. The first radio resource control connection state and the second radio resource control connection state may be any one of RRC connection states, such as a CELL_DCH state, a CELL_PCH state, a CELL_FACH state, or a URA_PCH state.

The first reservation indication may be delivered by an RNC to the UE when the radio resource control connection state of the UE is transitioned and the UE leaves the first radio resource control connection state or at an initial feature configuration stage of a feature. For example, at an air interface, the RNC may send the first reservation indication to the UE by using a radio bearer (RB) setup message, a radio bearer reconfiguration message, or the like. The second reservation indication may be delivered by the RNC to the base station at an initial feature configuration stage or when the UE leaves the first radio resource control connection state. For example, at an Iub interface, the RNC may send the second reservation indication to the base station by using a radio link (RL) setup message, a radio link reconfiguration message, or the like.

Therefore, the indication unit 101 may be further configured to send the second reservation indication to the base station by using a radio link setup message or a radio link reconfiguration message; or may be configured to send the first reservation indication to the UE by using a radio bearer setup message or a radio bearer reconfiguration message.

The first reservation indication may have multiple forms, and may be selected according to a requirement in actual use. Specifically, any one of a form 1, a form 2, or a form 3 in the following may be used. The reservation indication of the configuration information element is uniformly used for description below.

Form 1: The reservation indication of the configuration information element may include a second bit string, each bit in the second bit string corresponds to one configuration information element saved in the first radio resource control connection state, and a value of a bit is used to represent whether a configuration information element corresponding to the bit needs to be reserved when a radio resource control connection state is transitioned.

For example, when a value of a bit in the second bit string is 1, it represents that when a radio resource control connection state is transitioned, a configuration information element corresponding to the bit needs to be saved. If the value of the bit is o, it represents that when the radio resource control connection state is transitioned, the configuration information element corresponding to the bit does not need to be saved, and vice versa. The description of the reservation indication of the configuration information element is shown in Table 1.

TABLE 1

| Information Element | Type and reference | Semantics description |
| --- | --- | --- |
| Reservation indication of a configuration information element | BitString (a quantity of information elements to be configured) | When the UE leaves the first radio resource control connection state, a bit corresponding to a configuration information element that needs to be reserved is set to "1"; otherwise, the bit is set to "0". A first bit corresponds to a configuration information element A, a second bit corresponds to a configuration information element B, a third bit |

TABLE 1-continued

| Information Element | Type and reference | Semantics description |
|---|---|---|
| | | corresponds to a configuration information element C, and a fourth bit corresponds to a configuration information element D. The first bit corresponds to a bit on a leftmost side, the second bit corresponds to a bit that is on a right side of and that is adjacent to the leftmost side bit, and situations of other bits can be obtained in the same manner. |

According to Table 1, it is assumed that four configuration information elements exist, for example, a first configuration information element, a second configuration information element, a third configuration information element, and a fourth configuration information element that are different from each other, which respectively correspond to four different features, for example, any four of DC-HSDPA, HSDPA, HSUPA, DTX/DRX, 4C-HSDPA, or DC-HSUPA. The radio resource control connection state from which the UE needs to leave is the first radio resource control connection state. In the first radio resource control connection state, the UE and the base station are configured with a first configuration parameter, a second configuration parameter, a third configuration parameter, and a fourth configuration parameter that respectively correspond to the first, second, third, and fourth configuration information elements. When the UE leaves the first radio resource control connection state, if the UE or the UE and the base station need to save all the first, second, third, and fourth configuration information elements, a value of the second bit string may be set to 1111. If only the first and third configuration information elements need to be saved, the value of the second bit string may be set to 1010. When the UE leaves the first radio resource control connection state, the UE or the UE and the base station save only the first and third configuration information elements but do not save the second and fourth configuration information elements.

Form 2: The reservation indication of the configuration information element may also include reservation indications of multiple sub-configuration information elements. A reservation indication of each sub-configuration information element corresponds to one configuration information element saved by the UE or the UE and the base station in the first radio resource control connection state. If the UE or the UE and the base station need to save a configuration information element when the UE leaves the first radio resource control connection state, the radio network controller sends a reservation indication of a sub-configuration information element corresponding to the configuration information element to the UE or the UE and the base station. If the UE or the UE and the base station do not need to save a configuration information element, the radio network controller does not send a reservation indication of a sub-configuration information element corresponding to the configuration information element to the UE or the UE and the base station.

For example, the UE or the UE and the base station save a first configuration information element, a second configuration information element, a third configuration information element, and a fourth configuration information element that are different from each other, which respectively correspond to four different features, for example, any four of DC-HSDPA, HSDPA, HSUPA, DTX/DRX, 4C-HSDPA, or DC-HSUPA. When the UE leaves the first radio resource control connection state, if all the four configuration information elements need to be saved, a reservation indication that includes four sub-configuration information elements respectively corresponding to the first, second, third, and fourth configuration information elements may be sent. If only the first and third configuration information elements need to be saved, only reservation indications of two sub-configuration information elements respectively corresponding to the first and third configuration information elements are sent.

Optionally, the foregoing reservation indication of a sub-configuration information element may also be a reservation indication field of a configuration information element or a reservation indication bit of a configuration information element in the configuration information element. For example, the radio network controller may add the reservation indication field of the configuration information element or the reservation indication bit of the configuration information element to the configuration information element sent to the UE or the UE and the base station. The UE or the UE and the base station determine, according to whether the reservation indication field of the configuration information element or the reservation indication bit of the configuration information element exists, or whether the reservation indication field of the configuration information element or the reservation indication bit of the configuration information element is a predetermined value, whether the configuration information element needs to be saved.

For example, it may be specified that if a value of the reservation indication bit of the configuration information element is 1, it represents that the UE or the UE and the base station need to save the configuration information element when the UE leaves the first radio resource control connection state. If the value of the reservation indication bit is o, it represents that the UE or the UE and the base station do not need to save the configuration information element when the UE leaves the first radio resource control connection state. When the UE leaves the first radio resource control connection state, if it is determined that the value of the reservation indication bit of the configuration information element is 1, the configuration information element is saved, or if the value of the reservation indication bit of the configuration information element value is o, the configuration information element is deleted.

Form 3: The reservation indication of the configuration information element may also be one fixed reservation identifier. A value of the reservation indication of the configuration information element is used to instruct the UE or the UE and the base station to reserve, when the UE leaves the first radio resource control connection state, each configuration information element saved in the first radio resource control connection state.

For example, a first bit of a specific information element or an information element sent by the RNC to the UE or the UE and the base station is a reservation identifier bit. If a value of the reservation indication bit is 1, that is, the reservation identifier is 1, when the UE leaves the first radio resource control connection state, the UE or the UE and the base station reserve all configuration information elements saved in the first radio resource control connection state. Correspondingly, if the value of the reservation identifier bit is o, that is, the reservation identifier is o, when the UE leaves the first radio resource control connection state, the UE or the UE and the base station do not reserve all the configuration information elements saved in the first radio resource control connection state.

The enable unit 102 is configured to: when the UE reenters the first radio resource control connection state, send a first enable indication of the configuration information element to the UE, where the first enable indication is used to instruct the UE to use the reserved configuration information element to perform feature configuration.

For example, the enable unit 102 sends a radio bearer setup message or a radio bearer reconfiguration message to the UE, where the radio bearer setup message or the radio bearer reconfiguration message carries the first enable indication of the configuration information element.

In a possible implementation manner, the enable unit 102 may further be configured to: when the UE reenters the first radio resource control connection state, send a second enable indication of the configuration information element to the base station, where the second enable indication is used to instruct the base station to use the configuration information element to perform feature configuration.

For example, the enable unit 102 sends a radio link setup message or a radio link reconfiguration message to the base station, where the radio link setup message or the radio link reconfiguration message carries the second enable indication of the configuration information element.

When the UE reenters the first radio resource control connection state, if the UE or the UE and the base station need to enable a feature, because the UE or the UE and the base station have reserved a configuration information element corresponding to the feature, the radio network controller may no longer send the configuration information element corresponding to the feature to the UE or the UE and the base station, but instead send only an enable indication of the configuration information element, where the enable indication is used to instruct the UE or the UE and the base station to use the configuration information element to perform feature configuration. After receiving the enable indication of the configuration information element, the UE or the UE and the base station use the saved configuration information element to perform feature configuration.

In actual use, the UE or the UE and the base station may reserve multiple configuration information elements, but need to use only one or several of the configuration information elements to perform feature configuration. In this case, the radio network controller may generate an enable indication of the configuration information element, where the enable indication is used to instruct the UE or the UE and the base station to use the configuration information element to be enabled corresponding to the feature to be enabled to perform feature configuration.

In a specific implementation manner, the second reservation indication may have multiple forms, and for details, refer to any one of the foregoing forms 1, 2, or 3. For example, the second reservation indication may include a first bit string, each bit in the first bit string corresponds to one configuration information element saved in the first radio resource control connection state, and a value of a bit is used to represent whether a configuration information element corresponding to the bit needs to be reserved when a radio resource control connection state is transitioned.

In a specific implementation manner, the first enable indication may have multiple forms, and may be selected according to a requirement in actual use. Specifically, any one of a form 1, a form 2, or a form 3 in the following may be used. The enable indication of the configuration information element is uniformly used for description below.

Form 1: The enable indication of the configuration information element may include a fourth bit string. Each bit in the fourth bit string corresponds to one configuration information element. A value of a bit is used to represent whether a saved configuration information element corresponding to the bit needs to be used to perform feature configuration. For example, it may be agreed that if a value of a bit is 1, it represents that a configuration information element corresponding to the bit needs to be used to perform feature configuration. If the value of the bit is 0, it represents that a configuration information element corresponding to the bit does not need to be used to perform feature configuration. If the UE or the UE and the base station save four configuration information elements: a first configuration information element, a second configuration information element, a third configuration information element, and a fourth configuration information element that are different from each other, which respectively correspond to four different features, for example, any four of DC-HSDPA, HSDPA, HSUPA, DTX/DRX, 4C-HSDPA, or DC-HSUPA. When the first, second, third, and fourth configuration information elements need to be enabled, a value of the fourth bit string may be set to 1111. When only the first and third configuration information elements need to be enabled, the value of the fourth bit string may be set to 1010. In this case, the second and fourth configuration information elements are disabled.

It should be noted that bit strings included in the first enable indication and the second enable indication may the same or may be different.

Form 2: The enable indication of the configuration information element may include enable indications of one or more sub-configuration information elements. An enable indication of each sub-configuration information element corresponds to one configuration information element. An enable indication of each sub-configuration information element represents that a saved configuration information element corresponding to the enable indication of the sub-configuration information element needs to be used to perform feature configuration. For example, when the UE or the UE and the base station have reserved four configuration information elements: a first configuration information element, a second configuration information element, a third configuration information element, and a fourth configuration information element that are different from each other, which respectively correspond to four different features, for example, any four of DC-HSDPA, HSDPA, HSUPA, DTX/DRX, 4C-HSDPA, or DC-HSUPA. If only the first configuration information element needs to be used to perform feature configuration, an enable indication of a sub-configuration information element corresponding to the first configuration information element is sent. If the first and third configuration information elements need to be enabled to perform feature configuration, an enable indication of a sub-configuration information element corresponding to the first configuration information element and an enable indication of a sub-configuration information element corresponding to the third configuration information element are sent.

Form 3: One enable identifier may be used to indicate whether to enable all configuration information elements to perform configuration. For example, it may be pre-agreed that a bit of a first information element is used as an enable indication bit of the configuration information element. When a value of the bit is set to 1, the UE or the UE and the base station use all configuration information elements to perform feature configuration. When the value of the bit is set to 0, the UE or the UE and the base station do not use the configuration information element to perform feature configuration. Alternatively, when a value of the bit is set to 1, the UE or the UE and the base station do not use the configuration information element to perform feature configuration. When the value of the bit is set to o, the UE or the UE and the base station use all configuration information elements to perform feature configuration.

In a specific implementation manner, the second enable indication may have multiple forms, and may be selected according to a requirement in actual use. Specifically, any one of a form 1, a form 2, or a form 3 in the following may be used. For details, refer to related forms of the first enable indication. For example, the second enable indication may include a third bit string. Each bit in the third bit string corresponds to one configuration information element. A value of a bit is used to represent whether a saved configuration information element corresponding to the bit needs to be used to perform feature configuration, and details are no longer described.

Because existing UE and an existing base station may not have a signaling overhead optimization capability, before the reservation indication of the configuration information element is sent to the UE or the UE and the base station, whether the UE or the UE and the base station have a signaling overhead optimization capability may further be detected first. If the UE or the UE and the base station sends a signaling overhead optimization capability report, it is considered that the UE or the UE and the base station have the signaling overhead optimization capability.

Therefore, the apparatus may further include: a receiving unit, configured to receive a first signaling overhead optimization capability report reported by the UE, where the first signaling overhead optimization capability report is used to report that the UE has a capability of reserving the configuration information element saved in the first radio resource control connection state. The first signaling overhead optimization capability report may further be used to report to the RNC that the UE has a capability of enabling the saved configuration information element according to the enable indication of the configuration information element. The receiving unit is further configured to receive a second signaling overhead optimization capability report reported by the base station. The second signaling overhead optimization capability report is used to report that the base station has a capability of reserving the configuration information element saved in the first radio resource control connection state. The second signaling overhead optimization capability report may further be used to report to the RNC that the base station has a capability of enabling the saved configuration information element according to the enable indication of the configuration information element.

It should be further noted that the first radio resource control connection state may be only a specific radio resource control connection state, for example, CELL_DCH. The RNC sends the reservation indication of the configuration information element or the configuration information element and the reservation indication of the configuration information element to the UE or the UE and the base station for only the specific radio resource control connection state. For another radio resource control connection state, for example, URA_PCH, the RNC does not send the reservation indication of the configuration information element or the enable indication of the configuration information element, but instead sends a configuration information element according to a manner in the prior art when the UE or the UE and the base station need to use the configuration information element.

Certainly, the first radio resource control connection state may be any radio resource control connection state. When the first radio resource control connection state is any radio resource control connection state, to distinguish different radio resource control connection states, the reservation indication of the configuration information element may further carry a label for labeling a different radio resource control connection state. Similarly, when the first radio resource control connection state is any radio resource control connection state, to distinguish different radio resource control connection states, the enable indication of the configuration information element may also carry a label for labeling a different radio resource control connection state.

In this embodiment, the indication unit is configured to send a reservation indication of a configuration information element to UE or UE and a base station, where the reservation indication is used to instruct the UE or the UE and the base station to reserve, when a radio resource control connection state is transitioned, the configuration information element saved in a first radio resource control connection state; and the enable unit is configured to: when the UE reenters the first radio resource control connection state, send an enable indication of the configuration information element to the UE or the UE and the base station, where the enable indication is used to instruct the UE or the UE and the base station to use the configuration information element to perform feature configuration. By means of this embodiment, UE or UE and a base station may reserve a configuration information element according to an indication of an RNC instead of deleting the configuration information element, and when the UE or the UE and the base station need to enable a feature, the reserved configuration information element may be used according to an enable indication of the configuration information element to perform configuration, so that transmission of a configuration information element is reduced, thereby reducing signaling resources.

Figure 2:
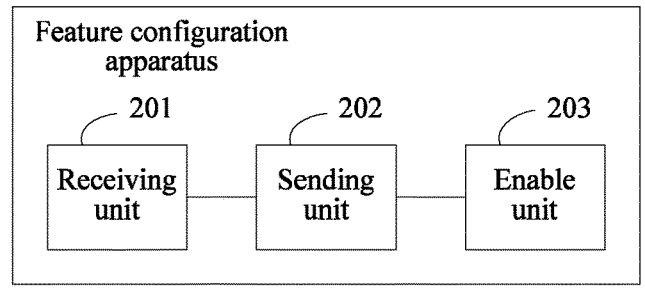
FIG. 2 is a schematic diagram of another embodiment of a feature configuration apparatus according to some embodiments.

Referring to FIG. 2, FIG. 2 is a schematic diagram of another embodiment of a feature configuration apparatus according to some embodiments. The feature configuration apparatus may be disposed on a radio network controller or may be a radio network controller. If UE or UE and a base station may reserve a saved configuration information element instead of deleting the configuration information element when a radio resource control connection state is transitioned, the RNC may directly send the configuration information element to the user equipment (UE), so that the UE reserves the configuration information element. A first radio resource control connection state is any one of a CELL_DCH state, a CELL_PCH state, a CELL_FACH state, or a URA_PCH state.

As shown in FIG. 2, the apparatus includes: a receiving unit 201, a sending unit 202, and an enable unit 203.

The receiving unit 201 is configured to receive a first signaling overhead optimization capability report reported by user equipment (UE), where the first signaling overhead optimization capability report is used to report that the UE has a capability of reserving a configuration information element saved in a first radio resource control connection state.

The RNC may determine, by using a signaling overhead optimization capability report, whether a base station and the UE reserve the configuration information element when the radio resource control connection state of the UE is transitioned.

The sending unit 202 is configured to send the configuration information element to the UE, so that the UE reserves the configuration information element.

The enable unit 203 is configured to: when the UE reenters the first radio resource control connection state, send a first enable indication of the configuration information element to the UE, where the first enable indication is used to instruct the UE to use the configuration information element to perform feature configuration.

The first enable indication may include a second bit string, each bit in the second bit string corresponds to one configuration information element, and a value of each bit is used to represent whether a saved configuration information element corresponding to the bit needs to be used to perform feature configuration. The first enable indication may also include enable indications of one or more sub-configuration information elements, and an enable indication of each sub-configuration information element corresponds to one configuration information element, and represents that a saved configuration information element corresponding to the enable indication of the sub-configuration information element needs to be used to perform feature configuration. The first enable indication may also include enable indications of one or more sub-configuration information elements, and an enable indication of each sub-configuration information element corresponds to one configuration information element, and represents that a saved configuration information element corresponding to the enable indication of the sub-configuration information element needs to be used to perform feature configuration. For detailed descriptions of the first enable indication, refer to the embodiment corresponding to FIG. 1, and details are no longer described herein.

The RNC may send the configuration information element to only the UE; or may send the configuration information element to both the UE and the base station, so that the base station reserves the configuration information element.

Therefore, in a possible implementation manner, the receiving unit 201 is further configured to receive a second signaling overhead optimization capability report reported by the base station, where the second signaling overhead optimization capability report is used to report that the base station has a capability of reserving the configuration information element saved in the first radio resource control connection state.

The sending unit 202 is further configured to: after the second signaling overhead optimization capability report is received, send the configuration information element to the base station, so that the base station reserves the configuration information element.

The enable unit 203 is further configured to: when the UE reenters the first radio resource control connection state, send a second enable indication of the configuration information element, where the second enable indication is further used to instruct the base station to use the configuration information element to perform feature configuration.

A manner of sending the configuration information element and the second enable indication to the base station is similar to a manner of sending the configuration information element and the first enable indication to the UE, and is no longer described herein.

By means of this embodiment, UE or UE and a base station may reserve a configuration information element according to an indication of an RNC instead of deleting the configuration information element, and when the UE or the UE and the base station need to enable a feature, the reserved configuration information element may be used according to an enable indication of the configuration information element to perform configuration, so that transmission of a configuration information element is reduced, thereby reducing signaling resources.

Figure 3:
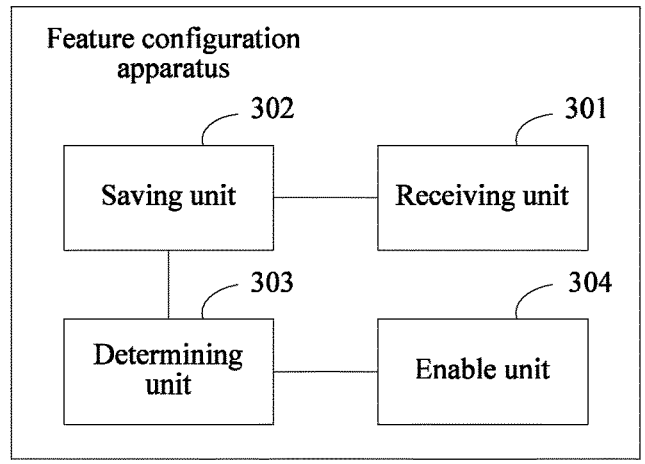
FIG. 3 is a schematic diagram of another embodiment of a feature configuration apparatus according to some embodiments.

Referring to FIG. 3, FIG. 3 is a schematic diagram of another embodiment of a feature configuration apparatus according to some embodiments. The feature configuration apparatus may be disposed on UE or a base station, or may be UE or a base station.

As shown in FIG. 3, the apparatus includes: a receiving unit 301, a saving unit 302, a determining unit 303, and an enable unit 304. The apparatus may be specifically a wireless communications device or a composition component of a wireless communications device.

The receiving unit 301 is configured to receive a reservation indication of a configuration information element sent by a radio network controller (RNC), where the reservation indication is used to instruct a wireless communications device to reserve the configuration information element saved in a first radio resource control connection state. The wireless communications device may refer to the UE or the base station.

The receiving unit 301 may determine the configuration information element according to received content of the reservation indication of the configuration information element. The reservation indication may include a first bit string or reservation indications of more than one sub-configuration information element or a reservation identifier. For a manner of sending the reservation indication of the configuration information element, forms and effects of the first bit string, the reservation indication of the sub-configuration information element, and the reservation identifier, and a manner of determining the configuration information element according to the reservation indication of the configuration information element, refer to the embodiment corresponding to FIG. 1, and details are no longer described herein.

The saving unit 302 is configured to reserve the configuration information element. For example, the saving unit 302 may reserve the configuration information element instead of deleting the configuration information element when a radio resource control connection state of the UE is transitioned.

The determining unit 303 is configured to: when an enable indication of the configuration information element is received, determine, according to the enable indication of the configuration information element and the reserved configuration information element, a configuration information element to be enabled.

Because the enable indication of the configuration information element may have multiple forms, the determining unit 303 may determine, in a different manner according to a different form of the enable indication of the configuration information element, a configuration information element to be enabled. The determining unit 303 may be configured to: when the enable indication of the configuration information element includes a second bit string, use a configuration information element corresponding to a bit, whose bit value is a specific value, in the second bit string as the configuration information element to be enabled; or configured to: when the enable indication of the configuration information element includes an enable indication of a sub-configuration information element, use, as the configuration information element to be enabled, a configuration information element indicated by an enable indication of each sub-configuration information element; or configured to: when the enable indication of the configuration information element includes an enable identifier, use all the configuration information elements as the configuration information element to be enabled.

The enable unit 304 is configured to use the configuration information element to be enabled to perform feature configuration.

A manner of using the configuration information element to be enabled to perform configuration is similar to a process of using a configuration information element to perform feature configuration in the prior art, and is not described herein.

By means of this embodiment, a wireless communications device may reserve a configuration information element according to an indication of an RNC instead of deleting the configuration information element, and when UE or UE and a base station need to enable a feature, the reserved configuration information element may be used according to an enable indication of the configuration information element to perform configuration, so that transmission of a configuration information element is reduced, thereby reducing signaling resources.

Figure 4:
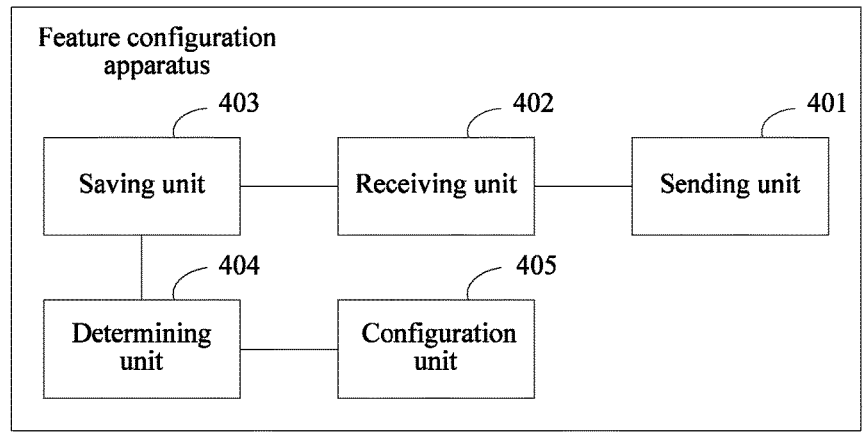
FIG. 4 is a schematic diagram of another embodiment of a feature configuration apparatus according to some embodiments.

Referring to FIG. 4, FIG. 4 is a schematic diagram of another embodiment of a feature configuration apparatus according to some embodiments. The feature configuration apparatus may be disposed on a wireless communications device, or may be a wireless communications device. The wireless communications device may be UE or a base station.

As shown in FIG. 4, the apparatus includes: a sending unit 401, a receiving unit 402, a saving unit 403, a determining unit 404, and a configuration unit 405.

When the wireless communications device has a capability of reserving a saved configuration information element instead of deleting the configuration information element when a radio resource control connection state of the UE is transitioned, the wireless communications device may first report the capability to a radio network controller. Therefore, the capability is used to implement signaling overhead optimization, thereby reducing signaling resources.

The sending unit 401 is configured to send a signaling overhead optimization capability report to a radio network controller (RNC), where the signaling overhead optimization capability report is used to report that the wireless communications device has a capability of reserving the configuration information element saved in a first radio resource control connection state.

After the RNC determines that the wireless communications device has the capability of reserving the configuration information element saved in the first radio resource control connection state, to reduce signaling overheads, the RNC may send the configuration information element to the wireless communications device. The configuration information element may be a configuration information element corresponding to a feature in a specific radio resource control connection state, or may also be configuration information elements corresponding to features in all radio resource control connection states.

The receiving unit 402 is configured to receive the configuration information element sent by the RNC.

The saving unit 403 is configured to reserve the configuration information element.

The receiving unit 402 is further configured to receive an enable indication of the configuration information element sent by the RNC.

When a radio resource control connection state of the UE is transitioned, the capability of reserving a configuration information element is used to reserve the configuration information element.

The determining unit 404 is configured to: when the enable indication is received, determine, according to the enable indication and the configuration information element, a configuration information element to be enabled.

If the enable indication includes a second bit string, a configuration information element corresponding to a bit, whose bit value is a specific value, in the second bit string is used as the configuration information element to be enabled. If the enable indication includes an enable indication of a sub-configuration information element, a configuration information element indicated by an enable indication of each sub-configuration information element is used as the configuration information element to be enabled. If the enable indication includes an enable identifier, all the configuration information elements are used as the configuration information element to be enabled.

Therefore, the determining unit 404 may be configured to: when the enable indication includes a second bit string, use a configuration information element corresponding to a bit, whose bit value is a specific value, in the second bit string as the configuration information element to be enabled; or configured to: when the enable indication includes an enable indication of a sub-configuration information element, use, as the configuration information element to be enabled, a configuration information element indicated by an enable indication of each sub-configuration information element; or configured to: when the enable indication includes an enable identifier, use all the configuration information elements as the configuration information element to be enabled.

A configuration unit 405 is configured to use the configuration information element to be enabled to perform feature configuration.

A manner of using the configuration information element to be enabled to perform configuration is similar to a process of using a configuration information element to perform feature configuration in the prior art, and is not described herein.

By means of this embodiment, a wireless communications device may reserve a configuration information element according to an indication of an RNC instead of deleting the configuration information element, and when the wireless communications device needs to be enable a feature, the reserved configuration information element may be used according to an enable indication of the configuration information element to perform configuration, so that transmission of a configuration information element is reduced, thereby reducing signaling resources.

Figure 5:
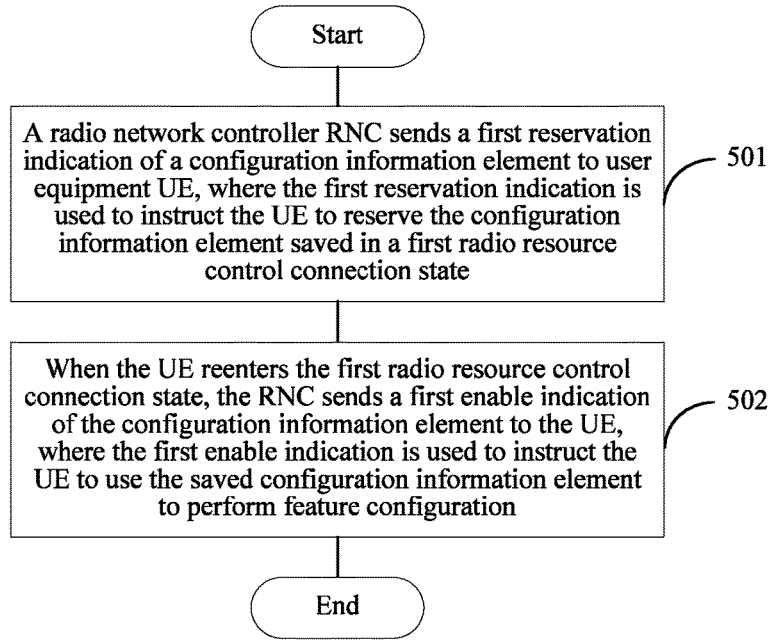
FIG. 5 is a flowchart of an embodiment of a feature configuration method according to some embodiments.

Referring to FIG. 5, FIG. 5 is a flowchart of an embodiment of a feature configuration method according to some embodiments.

Step 501: A radio network controller (RNC) sends a first reservation indication of a configuration information element to user equipment (UE), where the first reservation indication is used to instruct the UE to reserve the configuration information element saved in a first radio resource control connection state.

In another possible implementation manner, the radio network controller further sends the configuration information element and the first reservation indication of the configuration information element to the UE.

Optionally, before the radio network controller sends the reservation indication of the configuration information element to the UE, the radio network controller may further receive a first signaling overhead optimization capability report reported by the UE. The first signaling overhead optimization capability report is used to report that the UE has a capability of reserving the configuration information element in the first radio resource control connection state when the UE leaves the first radio resource control connection state.

In another possible implementation manner, the radio network controller further sends a second reservation indication of the configuration information element to a base station, where the second reservation indication is further used to instruct the base station to reserve the configuration information element in the first radio resource control connection state.

In another possible implementation manner, the radio network controller further sends a second reservation indication of the configuration information element to the base station or sends the configuration information element and a second reservation indication of the configuration information element to the base station, where the second reservation indication is further used to instruct the base station to reserve the configuration information element in the first radio resource control connection state.

Optionally, before the radio network controller sends the reservation indication of the configuration information element to the base station, the controller may further receive a second signaling overhead optimization capability report reported by the base station. The second signaling overhead optimization capability report is used to report that the base station has a capability of reserving the configuration information element in the first radio resource control connection state when the UE leaves the first radio resource control connection state.

The radio network controller may instruct, by using the first reservation indication, the UE to reserve the configuration information element. In this case, the radio network controller also reserves the configuration information element. Further, the radio network controller may instruct, by using the second reservation indication, the base station to reserve the configuration information element. In this case, the radio network controller may or may not reserve the configuration information element. That is, it is feasible as long as that both a network and the UE reserve the configuration information element.

For example, the first reservation indication is used to instruct the UE to reserve, when a radio resource control connection state of the UE is transitioned, the configuration information element in the radio resource control connection state from which the UE is to leave.

For example, the second reservation indication is used to instruct the base station to reserve, when the radio resource control connection state of the UE is transitioned, the configuration information element in the radio resource control connection state from which the UE is to leave.

In another embodiment, the radio network controller may send the first reservation indication to the UE or send the configuration information element and the first reservation indication to the UE when the UE enters the first radio resource control connection state for the first time or reenters the first radio resource control connection state or is in the first radio resource control connection state. Further, the radio network controller may send the second reservation indication to the base station or send the configuration information element and the second reservation indication to the base station when the UE enters the first radio resource control connection state for the first time or reenters the first radio resource control connection state or is in the first radio resource control connection state.

In another embodiment, the radio network controller may also send the first reservation indication to the UE or send the configuration information element and the first reservation indication to the UE when the UE is transitioned from the first radio resource control connection state to a second radio resource control connection state, that is, when the radio resource control connection state is transitioned. Further, the radio network controller may also send the second reservation indication to the base station or send the configuration information element and the second reservation indication to the base station when the UE is transitioned from the first radio resource control connection state to the second radio resource control connection state. The first radio resource control connection state and the second radio resource control connection state are different.

The first radio resource control connection state is a radio resource control connection state of the UE before the radio resource control connection state of the UE is transitioned. The second radio resource control connection state is a radio resource control connection state after the radio resource control connection state of the UE is transitioned, and the second radio resource control connection state is different from the first radio resource control connection state. The first resource control connection state and the second radio resource control connection state may be any one of RRC connection states, such as a CELL_DCH state, a CELL_PCH state, a CELL_FACH state, or a URA_PCH state.

In another embodiment, only when the UE leaves a radio resource control connection state, for example, the UE leaves the CELL_DCH state or the CELL_PCH state or the CELL_FACH state or the URA_PCH state, for only the radio resource control connection state from which the UE leaves, the radio network controller may send the first reservation indication to the UE or send the configuration information element and the first reservation indication to the UE. Further, only when the UE leaves one of the foregoing radio resource control connection states, the radio network controller may send the second reservation indication to the base station or send the configuration information element and the second reservation indication to the base station. When the UE leaves another radio resource control connection state, the radio network controller does not send a reservation indication of the configuration information element, but instead needs to send a same configuration information element to the UE.

In another embodiment, for any radio resource control connection state from which the UE leaves, the radio network controller may further send the first reservation indication to the UE. To distinguish different radio resource control connection states, the first reservation indication carries a label for labeling a different radio resource control connection state. Further, for any radio resource control connection state from which the UE leaves, the radio network controller sends the second reservation indication to the base station, where the second reservation indication carries a label for labeling a different radio resource control connection state.

Therefore, the radio network controller instructs the UE or the UE and the base station to reserve the saved configuration information element in the first radio resource control connection state, so that when the UE reenters the first radio resource control connection state, the reserved configuration information element may be directly used to perform corresponding feature configuration.

The first reservation indication may be delivered in a form of reconfiguration message when state transition occurs, that is, when the UE leaves the first radio resource control connection state; or may also be delivered at an initial feature configuration stage of a feature. For example, at an air interface, the first reservation indication may be sent to the UE by using a radio bearer (RB) setup message or a radio bearer reconfiguration message. The second reservation indication may be delivered in a form of reconfiguration message when state transition occurs, that is, when the UE leaves the first radio resource control connection state; or may also be delivered at an initial feature configuration stage of a feature. For example, at an Iub interface, the second reservation indication may be sent to the base station by using a radio link (RL) setup message or a radio link reconfiguration message.

The first reservation indication and the second reservation indication may have multiple forms, and may be selected according to a requirement in actual use. For specific content of the reservation indication of the configuration information element, refer to the embodiment corresponding to FIG. 1, and details are no longer described herein.

Step 502: When the UE reenters the first radio resource control connection state, the RNC sends a first enable indication of the configuration information element to the UE, where the first enable indication is used to instruct the UE to use the configuration information element to perform feature configuration.

For example, the radio network controller sends a radio bearer setup message or a radio bearer reconfiguration message to the UE, where the radio bearer setup message or the radio bearer reconfiguration message carries the first enable indication of the configuration information element.

In a possible implementation manner, when the UE reenters the first radio resource control connection state, the radio network controller further sends a second enable indication of the configuration information element to the base station, where the second enable indication is further used to instruct the base station to use the saved configuration information element to perform feature configuration.

For example, the radio network controller sends a link setup message or a link reconfiguration message to the base station, where the link setup message or the link reconfiguration message carries the second enable indication of the configuration information element.

When the UE reenters the first radio resource control connection state, because the UE or the UE and the base station have reserved a configuration information element corresponding to the feature, the radio network controller may no longer send the configuration information element corresponding to the feature to the UE or the UE and the base station, but instead send only an enable indication of the configuration information element. After receiving the enable indication of the configuration information element, the UE or the UE and the base station use the saved configuration information element to perform feature configuration.

In actual use, the UE or the UE and the base station may reserve multiple configuration information elements, but only one or several of the configuration information elements need to be used to perform feature configuration. In this case, the radio network controller may generate an enable indication of the configuration information element, where the enable indication is used to instruct the UE or the UE and the base station to use a configuration information element to be enabled in the configuration information element to be enabled corresponding to the feature to be enabled to perform feature configuration. For a form and a content setting of the enable indication of the configuration information element, refer to the embodiment corresponding to FIG. 1, and details are no longer described herein.

In another possible implementation manner, only when the UE reenters a radio resource control connection state, for example, the UE reenters a CELL_DCH state or a CELL_PCH state or a CELL_FACH state, or a URA_PCH state, for only the radio resource control connection state that the UE reenters, the radio network controller may send the first enable indication of the configuration information element to the UE or send the configuration information element and the first enable indication to the UE. Further, only when the UE reenters one of the foregoing radio resource control connection states, for only the radio resource control connection state that the UE reenters, the radio network controller may send the second enable indication of the configuration information element to the base station or send the configuration information element and the second enable indication to the base station. When the UE enters another radio resource control connection state, the radio network controller does not send an enable indication of the configuration information element, but instead needs to send a corresponding configuration information element to the UE.

In another possible implementation manner, for any radio resource control connection state that the UE enters, the radio network controller may further send the first enable indication of the configuration information element to the UE. Further, for that the UE enters any radio resource control connection state, the radio network controller may further send the second enable indication of the configuration information element to the base station. To distinguish different radio resource control connection states, the first enable indication of the configuration information element carries a label for labeling a different radio resource control connection state, and the second enable indication carries a label for labeling a different radio resource control connection state.

By means of this embodiment, UE or UE and a base station may reserve a configuration information element according to an indication of an RNC instead of deleting the configuration information element, and when the UE or the UE and the base station need to enable a feature, the reserved configuration information element may be used according to an enable indication of the configuration information element to perform configuration, so that transmission of a configuration information element is reduced, thereby reducing signaling resources.

Figure 6:
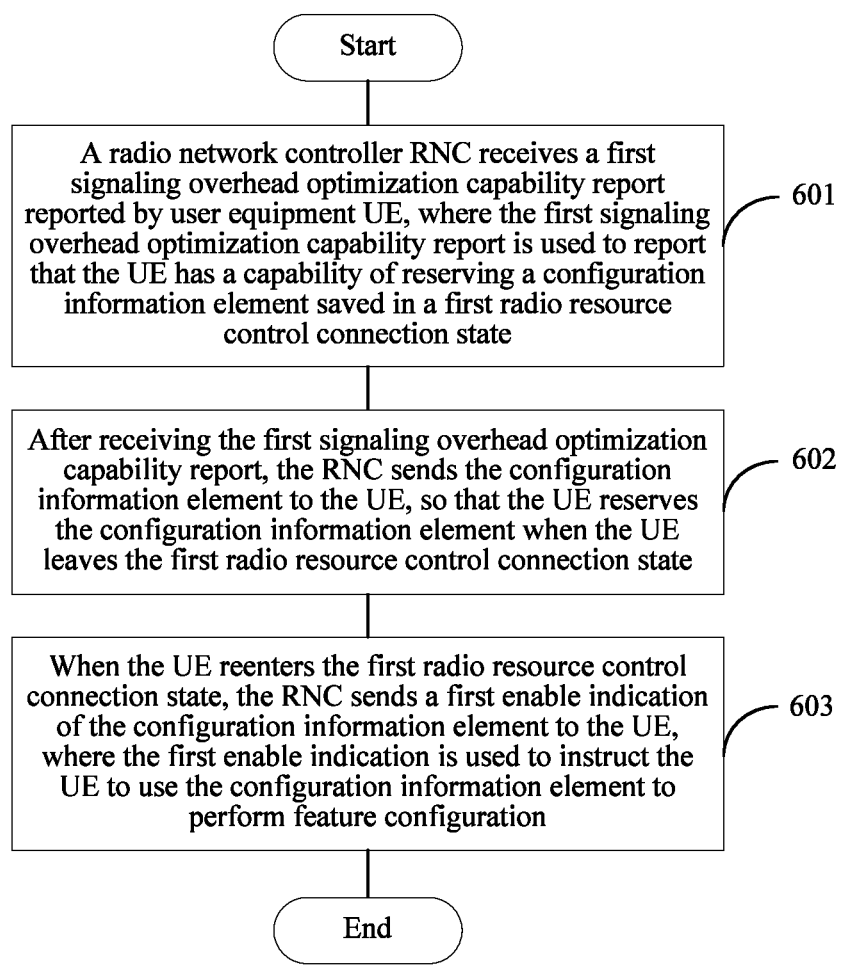
FIG. 6 is a flowchart of another embodiment of a feature configuration method according to some embodiments.

Referring to FIG. 6, FIG. 6 is a flowchart of another embodiment of a feature configuration method according to some embodiments. If UE has or UE and a base station have a capability of reserving a configuration information element, feature configuration may be performed in the following manner.

Step 601: A radio network controller (RNC) receives a first signaling overhead optimization capability report reported by user equipment (UE), where the first signaling overhead optimization capability report is used to report that the UE has a capability of reserving a configuration information element saved in a first radio resource control connection state.

Before sending the configuration information element to the UE, the RNC first receives the first signaling overhead optimization capability report reported by the UE, where the first signaling overhead optimization capability report is used to report that the UE has the capability of reserving the configuration information element saved in the first radio resource control connection state. After receiving the first signaling overhead optimization capability report, the RNC may determine that when a radio resource control connection state is transitioned, the UE reserves a saved configuration information element instead of deleting the configuration information element. In this case, the RNC may directly send, to the UE, the configuration information element that needs to be reserved by the UE, so that the UE saves the configuration information element.

In a possible implementation manner, before sending a configuration information element to a base station, the RNC may further first receive a second signaling overhead optimization capability report reported by the base station, where the second signaling overhead optimization capability report is used to report that the base station has a capability of reserving the configuration information element saved in the first radio resource control connection state. After receiving the second signaling overhead optimization capability report, the RNC may determine that when a radio resource control connection state of the UE is transitioned, the base station reserves a saved configuration information element instead of deleting the configuration information element. In this case, the RNC may directly send, to the base station, the configuration information element that needs to be reserved by the base station.

Step 602: The RNC sends the configuration information element to the UE, so that the UE reserves the configuration information element.

In a possible implementation manner, the RNC sends the configuration information element to the base station, so that the base station reserves the configuration information element.

If it has been preset in a communications system that when the UE leaves the first radio resource control connection state, the UE or the UE and the base station that have a signaling overhead optimization capability reserve the saved configuration information element instead of deleting the configuration information element, the RNC may also directly send the configuration information element to the UE or the UE and the base station, so that the UE or the UE and the base station reserve the configuration information element.

Step 603: When the UE reenters the first radio resource control connection state, the RNC sends a first enable indication of the configuration information element to the UE, where the first enable indication is used to instruct the UE to use the configuration information element to perform feature configuration.

In a possible implementation manner, when the UE reenters the first radio resource control connection state, in addition to sending the first enable indication of the configuration information element to the UE, the RNC may further send a second enable indication of the configuration information element to the base station, where the second enable indication is further used to instruct the base station to use the configuration information element to perform feature configuration.

When the UE reenters the first radio resource control connection state, because the UE or the UE and the base station have reserved a configuration information element corresponding to a feature, the radio network controller may no longer send the configuration information element corresponding to the feature to the UE or the UE and the base station, but instead send only an enable indication of the configuration information element, where the enable indication is used to instruct the UE or the UE and the base station to use the configuration information element to perform feature configuration. After receiving the enable indication of the configuration information element, the UE or the UE and the base station use the saved configuration information element to perform feature configuration.

In actual use, the UE or the UE and the base station may reserve multiple configuration information elements, but only one or several of the configuration information elements need to be used to perform feature configuration. In this case, the radio network controller may generate an enable indication of the configuration information element, where the enable indication is used to instruct the UE or the UE and the base station to use a configuration information element to be enabled in the configuration information element to be enabled corresponding to the feature to be enabled to perform feature configuration. For a form and a content setting of the enable indication of the configuration information element, refer to the embodiment in FIG. 1, and details are no longer described herein.

It should be noted that, in this embodiment, when the UE initially enters the first radio resource control connection state, only the UE has a capability of reserving the configuration information element in the first radio resource control connection state. In consideration that the base station may be involved to generate configuration parameters corresponding to some configuration information elements, when the RNC determines that a configuration parameter of a configuration information element that needs to be enabled is inconsistent with the configuration parameter generated by the base station, the RNC still needs to send the configuration information element instead of sending the enable indication of the configuration information element.

CELL_DCH is used as an example below to further describe the present invention.

Figure 7:
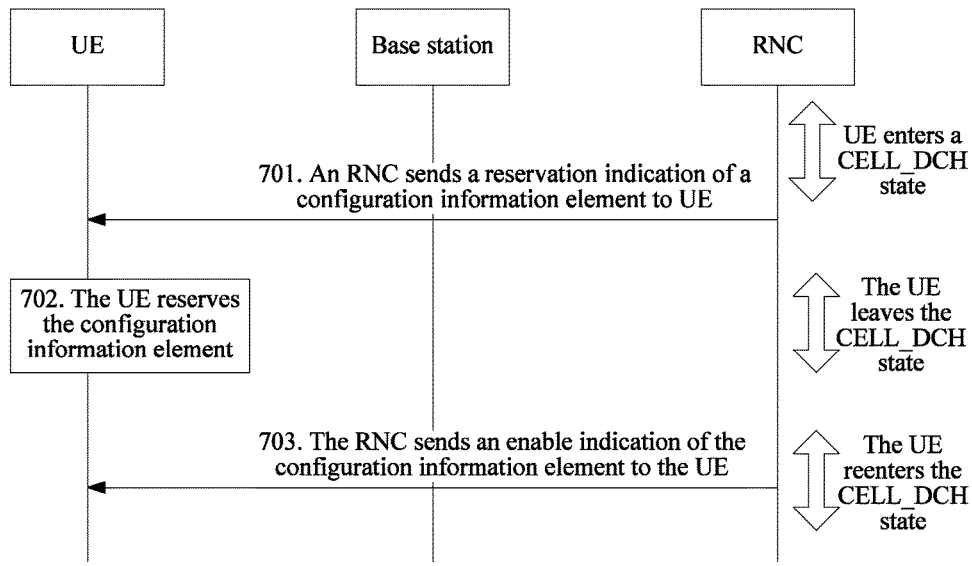
FIG. 7 is a flowchart of another embodiment of a feature configuration method according to some embodiments.

Referring to FIG. 7, FIG. 7 is a schematic diagram of another embodiment of a feature configuration method according to some embodiments. In this embodiment, when UE initially enters a CELL_DCH state, an RNC sends a reservation indication of a configuration information element and an enable indication of the configuration information element to only the UE. The reservation indication is used to instruct the UE to save the configuration information element, and the enable indication is used to instruct the UE to use the reserved configuration information element to perform configuration feature configuration corresponding to the configuration information element. When the UE enables a feature, a base station may be involved to generate a configuration parameter corresponding to the feature. Therefore, when the RNC determines that a configuration parameter of a configuration information element that needs to be enabled is inconsistent with the configuration parameter generated by the base station, the RNC still needs to send the configuration information element instead of sending the enable indication of the configuration information element. The feature configuration method is described as follows.

Step 701: When UE enters a CELL_DCH state, an RNC sends a reservation indication of a configuration information element to the UE.

The reservation indication of the configuration information element is used to instruct the UE to reserve the configuration information element in the CELL_DCH state.

For example, the RNC sends a radio bearer setup message or a radio bearer reconfiguration message to the user equipment. The radio bearer setup message or the radio bearer reconfiguration message carries the reservation indication of the configuration information element. For details of the reservation indication of the configuration information element, refer to the content described in the embodiment shown in FIG. 1, and details are no longer described herein.

Optionally, before the RNC sends the reservation indication of the configuration information element to the UE, the controller may further receive a signaling overhead optimization capability report reported by the UE. The signaling overhead optimization capability report is used to report a capability of reserving the configuration information element in CELL_DCH when the UE leaves the CELL_DCH state.

Before sending the reservation indication of the configuration information element, the RNC may further first instruct the base station to perform radio link setup or radio link reconfiguration. A manner of performing radio link setup or radio link reconfiguration is similar to that in the prior art, and is not described herein.

Step 702: When the UE leaves the CELL_DCH state, the UE reserves the configuration information element.

When a data transmission requirement of the UE is reduced, a manner such as physical channel reconfiguration may be used to instruct the UE to perform state transition. When performing state transition, the UE reserves the configuration information element according to the reservation indication of the configuration information element.

After state transition of the UE occurs, the RNC may instruct the base station to delete an established link.

Step 703: When the UE reenters the CELL_DCH state, the RNC sends an enable indication of the configuration information element to the UE.

The enable indication of the configuration information element is used to instruct the UE to use the saved configuration information element to perform feature configuration.

For example, the controller sends a radio bearer setup message or a radio bearer reconfiguration message to the user equipment, where the radio bearer setup message or the radio bearer reconfiguration message carries the enable indication of the configuration information element. For details of the enable indication of the configuration information element, refer to the content described in the embodiment shown in FIG. 1, and details are no longer described herein.

Before the UE reenters the CELL_DCH state, the RNC may first instruct the base station to perform link setup again. A specific process of link setup is no longer described herein.

In this embodiment, the RNC does not need to instruct the base station to reserve the configuration information element, but the RNC needs to save the configuration information element. When the UE reenters the CELL_DCH state, the RNC and the base station initiate a process of configuring a feature to be enabled, and the base station generates a corresponding configuration information element. After the RNC receives a configuration feedback of the base station, the RNC compares the configuration information element generated by the base station with the configuration information element saved by the RNC. If the configuration information element generated by the base station is the same as the configuration information element saved by the RNC, and when the RNC determines that the feature to be enabled needs to be enabled, the RNC sends an enable indication of the configuration information element to the UE, to instruct the UE to use the configuration information element saved by the UE to perform feature configuration. If the configuration information element generated by the base station is different from the configuration information element saved by the controller, the RNC resends a configuration information element corresponding to the feature to be enabled to the UE.

According to the description of the foregoing embodiment, for the feature configuration method, a same configuration information element does not need to be repetitively sent, but instead, UE uses a configuration information element saved by the UE to configure a configuration parameter, so that a waste of signaling resources may be reduced or avoided, thereby improving a success rate of signaling transmission of an air interface.

Figure 8:
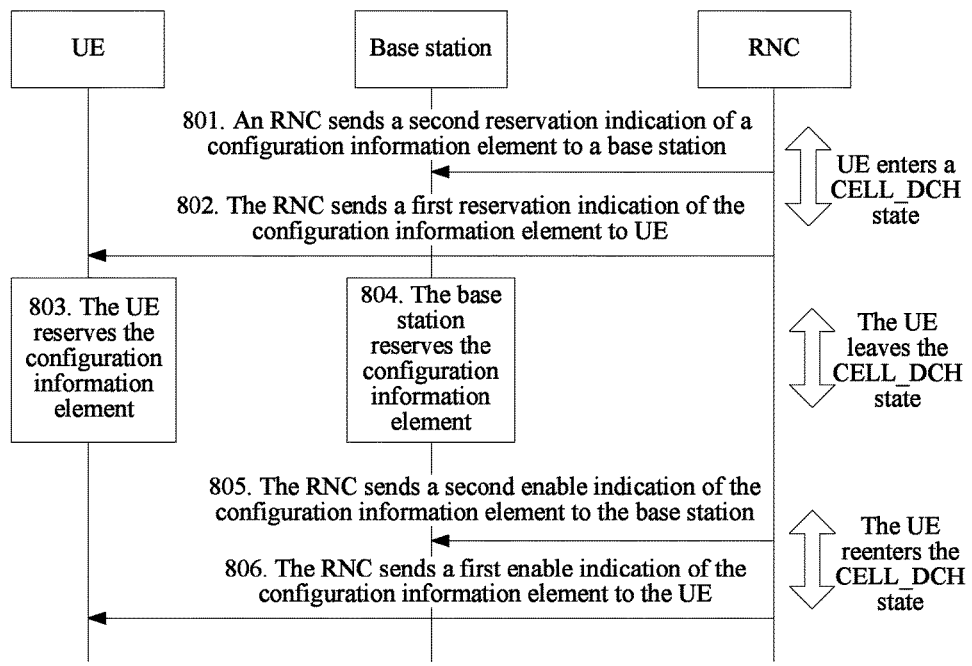
FIG. 8 is a flowchart of another embodiment of a feature configuration method according to some embodiments.

Referring to FIG. 8, FIG. 8 is a schematic diagram of another embodiment of a feature configuration method according to some embodiments. In this embodiment, when UE initially enters a CELL_DCH state, an RNC sends a first reservation indication of a configuration information element to the UE, where the first reservation indication is used to instruct the UE to reserve the configuration information element in the CELL_DCH state, and the RNC sends a second reservation indication of the configuration information element to a base station, where the second reservation indication is used to instruct the base station to reserve the configuration information element in the CELL_DCH state. The first reservation indication and the second reservation indication may have a same form. When the UE reenters the CELL_DCH state, the RNC sends a first enable indication of the configuration information element to the UE, where the first enable indication is used to instruct the UE to use the reserved configuration information element to enable a corresponding feature, and the RNC sends a second enable indication of the configuration information element to the base station, where the second enable indication is used to instruct the base station to use the reserved configuration information element to enable a corresponding feature. The second enable indication and the first enable indication may have a same form.

Step 801: When UE enters a CELL_DCH state, an RNC sends a second reservation indication of a configuration information element to a base station.

The second reservation indication is used to instruct the base station to reserve the configuration information element in the CELL_DCH state.

For example, the RNC sends a radio link setup message or a radio link reconfiguration message to the base station, where the radio link setup message or the radio link reconfiguration message carries the second reservation indication of the configuration information element. For details of the second reservation indication, refer to the content described in the embodiment shown in FIG. 1, and details are no longer described herein.

Corresponding to a feature that needs to be enabled by the UE, the RNC further needs to send a configuration information element corresponding to the feature to the base station.

Optionally, before sending the reservation indication of the configuration information element, the RNC may further receive a second signaling overhead optimization capability report reported by the base station. The second signaling overhead optimization capability report is used to report that the base station has a capability of reserving the configuration information element when the UE leaves the CELL_DCH state. Content of the second signaling overhead optimization capability report may include, but is not limited to, a triggering manner of reserving the configuration information element by the base station and a triggering manner of enabling the reserved configuration information element.

Step 802: The RNC sends a first reservation indication of the configuration information element to the UE.

The first reservation indication is further used to instruct the UE to reserve the configuration information element in CELL_DCH state.

For example, the RNC sends a radio bearer setup message or a radio bearer reconfiguration message to the user equipment, where the radio bearer setup message or the radio bearer reconfiguration message carries the first reservation indication of the configuration information element. For details of the first reservation indication, refer to the content described in the embodiment shown in FIG. 1, and details are no longer described herein.

The second reservation indication and the first reservation indication may have a same form and a same content setting.

Optionally, before the RNC sends the reservation indication of the configuration information element to the UE, the controller may further receive a first signaling overhead optimization capability report reported by the UE. The first signaling overhead optimization capability report is used to report a capability of reserving the configuration information element in CELL_DCH when the UE leaves the CELL_DCH state.

Before sending a bearer setup indication or a reconfiguration indication, the RNC may further first instruct the UE to perform bearer setup or reconfiguration.

Step 803: When the UE leaves the CELL_DCH state, the UE reserves a designated configuration.

When a data transmission requirement of the UE is reduced, a manner such as physical channel reconfiguration may be used to instruct the UE to perform state transition, and an established link and an established bearer may be reconfigured. When the UE leaves the CELL_DCH state, the UE reserves the designated configuration.

Step 804: The base station reserves the configuration information element.

Step 805: When the UE reenters the CELL_DCH state, the RNC sends a second enable indication of the configuration information element to the base station.

The second enable indication is used to instruct the base station to use the saved configuration information element to perform feature configuration.

For example, the controller sends a radio link setup message or a radio link reconfiguration message to the base station, where the radio link setup message or the radio link reconfiguration message carries the second enable indication of the configuration information element. For details of the second enable indication, refer to the content described in the embodiment shown in FIG. 1, and details are no longer described herein.

Step 806: When the UE reenters the CELL_DCH state, the RNC sends a first enable indication of the configuration information element to the UE.

The first enable indication is used to instruct the UE to use the saved configuration information element to perform feature configuration.

For example, the controller sends a radio bearer setup message or a radio bearer reconfiguration message to the user equipment, where the radio bearer setup message or the radio bearer reconfiguration message carries the first enable indication of the configuration information element. For details of the first enable indication, refer to the content described in the embodiment shown in FIG. 1, and details are no longer described herein.

The first enable indication and the second enable indication may have a same form and a same content setting.

By means of this embodiment, the RNC may reserve the configuration information element, or may not reserve the configuration information element. When the UE reenters the CELL_DCH state, after receiving the first enable indication, the UE uses the configuration information element reserved by the UE in the CELL_DCH state to perform feature configuration. After receiving the second enable indication, the base station uses the configuration information element reserved by the base station in the CELL_DCH state to perform feature configuration.

According to the description of the foregoing embodiment, for the feature configuration method, a same configuration information element does not need to be repetitively sent, but instead, UE uses a configuration information element saved by the UE to configure a configuration parameter, so that a waste of signaling resources may be reduced or avoided, thereby improving a success rate of signaling transmission of an air interface.

Figure 9:
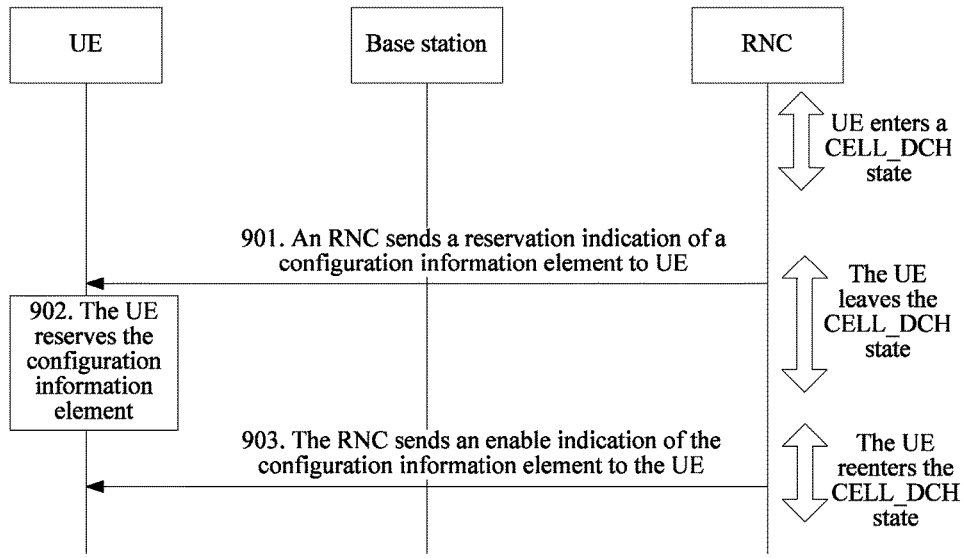
FIG. 9 is a flowchart of another embodiment of a feature configuration method according to some embodiments.

Referring to FIG. 9, FIG. 9 is a schematic diagram of another embodiment of a feature configuration method according to some embodiments. In this embodiment, when a radio resource control connection state of UE is transitioned, that is, the UE leaves a CELL_DCH state, an RNC sends a reservation indication of a configuration information element and an enable indication of the configuration information element to only the UE. The reservation indication is used to instruct the UE to save the configuration information element, and the enable indication is used to instruct the UE to use the configuration information element saved by the UE to perform configuration feature configuration corresponding to the configuration information element. When the UE enables a feature, a base station may be involved to generate a configuration parameter corresponding to the feature. Therefore, when the RNC determines that a configuration parameter of a configuration information element that needs to be enabled is inconsistent with the configuration parameter generated by the base station, the RNC still needs to send the configuration information element instead of sending the enable indication of the configuration information element. The feature configuration method is described as follows.

Step 901: When UE leaves a CELL_DCH state, an RNC sends a reservation indication of a configuration information element to the UE.

The reservation indication is used to instruct the UE to reserve the configuration information element in CELL_DCH.

For example, the RNC sends a radio bearer reconfiguration message to the user equipment, where the radio bearer reconfiguration message carries the reservation indication of the configuration information element. For details of the reservation indication, refer to the content described in the embodiment shown in FIG. 1, and details are no longer described herein.

Optionally, before sending the reservation indication of the configuration information element, the RNC may further receive a signaling overhead optimization capability report reported by the UE. The signaling overhead optimization capability report is used to report a capability of reserving the configuration information element when the UE leaves the CELL_DCH state. Content of the signaling overhead optimization capability report may include, but is not limited to, a triggering manner of reserving the configuration information element by the UE and a triggering manner of enabling the reserved configuration information element.

Before step 901, the RNC may further first instruct the base station to perform link setup or reconfiguration, and instruct the UE to perform bearer setup or reconfiguration.

After step 901, the RNC may further instruct the base station to delete a link.

Step 902: When the UE leaves the CELL_DCH state, the UE reserves the configuration information element.

Step 903: When the UE reenters the CELL_DCH state, the RNC sends an enable indication of the configuration information element to the UE.

The enable indication is used to instruct the UE to use the saved configuration information element to perform feature configuration.

For example, the RNC sends a radio bearer setup message or a radio bearer reconfiguration message to the user equipment, where the radio bearer setup message or the radio bearer reconfiguration message carries the enable indication. For details of the enable indication, refer to the content described in the embodiment shown in FIG. 1, and details are no longer described herein.

Before step 903, the RNC may further first instruct the base station to perform link setup again.

In this embodiment, the RNC does not need to instruct the base station to reserve the configuration information element, but the controller needs to save the configuration information element. When the UE reenters the CELL_DCH state, the RNC and the base station initiate a process of configuring a feature to be enabled. The base station generates a corresponding configuration information element. After the RNC receives a configuration feedback of the base station, the RNC compares the configuration information element generated by the base station with the configuration information element saved by the RNC. If the configuration information element generated by the base station is the same as the configuration information element saved by the RNC, and when the RNC determines that the feature to be enabled needs to be enabled, the RNC sends an enable indication of the configuration information element to the UE, to instruct the UE to use the configuration information element saved by the UE to perform feature configuration. If the configuration information element generated by the base station is different from the configuration information element saved by the RNC, the RNC resends the configuration information element corresponding to the feature to be enabled to the UE.

According to the description of the foregoing embodiment, for the feature configuration method, a same configuration information element does not need to be repetitively sent, but instead, UE uses a configuration information element saved by the UE to configure a configuration parameter, so that a waste of signaling resources may be reduced or avoided, thereby improving a success rate of signaling transmission of an air interface.

Figure 10:
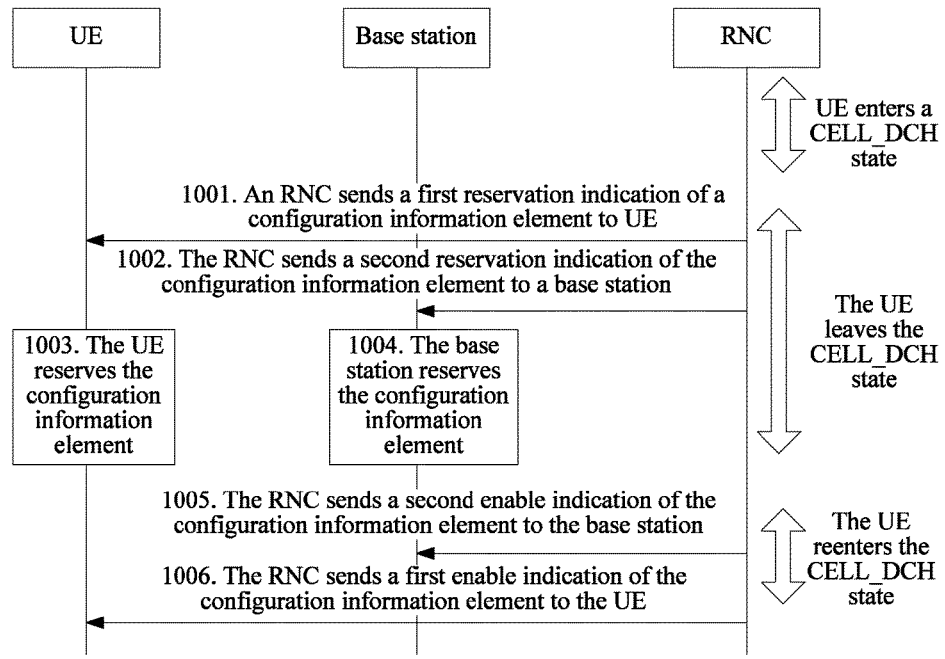
FIG. 10 is a flowchart of another embodiment of a feature configuration method according to some embodiments.

Referring to FIG. 10, FIG. 1*o* is a schematic diagram of another embodiment of a feature configuration method according to some embodiments. In this embodiment, when a radio resource control connection state of UE is transitioned, that is, when the UE leaves a CELL_DCH state, an RNC sends a second reservation indication of a configuration information element to a base station, where the second reservation indication is used to instruct the base station to reserve the configuration information element in the CELL_DCH state when the UE leaves the CELL_DCH state. The RNC sends a first reservation indication of the configuration information element to the UE, where the first reservation indication is used to instruct the UE to reserve the configuration information element in the CELL_DCH state when the UE leaves the CELL_DCH state. When the UE reenters the CELL_DCH state, the RNC sends a second enable indication of the configuration information element to the base station, where the second enable indication is used to instruct the base station to use the reserved configuration information element in the CELL_DCH state, to enable a corresponding feature. The RNC sends a first enable indication of the configuration information element to the UE, where the first enable indication is used to instruct the UE to use the reserved configuration information element in the CELL_DCH state, to enable a corresponding feature. The first reservation indication and the second reservation indication may have a same form. The first enable indication and the second enable indication may have a same form.

Step 1001: When UE leaves a CELL_DCH state, an RNC sends a first reservation indication of a configuration information element to the UE.

The first reservation indication is further used to instruct the UE to reserve the configuration information element in CELL_DCH.

For example, the RNC sends a radio bearer setup message or a radio bearer reconfiguration message to the UE, where the radio bearer setup message or the radio bearer reconfiguration message carries the first reservation indication of the configuration information element. For details of the first reservation indication, refer to the content described in the embodiment shown in FIG. 1, and details are no longer described herein.

Optionally, before the RNC sends the reservation indication of the configuration information element to the UE, the controller may further receive a first signaling overhead optimization capability report reported by the UE. The first signaling overhead optimization capability report is used to report a capability of reserving the configuration information element in CELL_DCH when the UE leaves the CELL_DCH state.

Step 1002: The RNC sends a second reservation indication of the configuration information element to a base station.

The second reservation indication is further used to instruct the base station to reserve the configuration information element in the CELL_DCH state.

For example, the RNC sends a radio link setup message or a radio link reconfiguration message to the base station, where the radio link setup message or the radio link reconfiguration message carries the second reservation indication of the configuration information element. For details of the second reservation indication, refer to the content described in the embodiment shown in FIG. 1, and details are no longer described herein.

Optionally, before the RNC sends the reservation indication of the configuration information element to the base station, the controller may further receive a second signaling overhead optimization capability report reported by the base station. The second signaling overhead optimization capability report is used to report that the base station has a capability of reserving the configuration information element in CELL_DCH when the UE leaves the CELL_DCH state.

The second reservation indication and the first reservation indication may have a same form and a same content setting.

Step 1003: When the UE leaves the CELL_DCH state, the UE reserves the configuration information element that is saved by the UE in the CELL_DCH state.

Step 1004: When the UE leaves the CELL_DCH state, the base station reserves the configuration information element that is saved by the base station in the CELL_DCH state.

Step 1005: When the UE reenters the CELL_DCH state, the RNC sends a second enable indication of the configuration information element to the base station.

The second enable indication is used to instruct the base station to use the reserved configuration information element to perform feature configuration.

For example, the RNC sends a radio link setup message or a radio link reconfiguration message to the base station, where the radio link setup message or the radio link reconfiguration message carries the second enable indication of the configuration information element. For details of the second enable indication, refer to the content described in the embodiment shown in FIG. 1, and details are no longer described herein.

Step 1006: The RNC sends a first enable indication of the configuration information element to the UE.

The first enable indication is further used to instruct the UE to use the reserved configuration information element to perform feature configuration.

For example, the RNC sends a radio bearer setup message or a radio bearer reconfiguration message to the UE, where the radio bearer setup message or the radio bearer reconfiguration message carries the first enable indication of the configuration information element. For details of the first enable indication, refer to the content described in the embodiment shown in FIG. 1, and details are no longer described herein.

The first enable indication and the second enable indication may have a same form and a same content setting.

By means of this embodiment, UE and a base station may respectively reserve respective corresponding configuration information elements according to a first reservation indication and a second reservation indication of an RNC instead of deleting the configuration information elements, and when the UE and the base station need to enable a feature, the respective corresponding reserved configuration information elements may be respectively used according to a first enable indication and a second enable indication to perform configuration, so that transmission of a configuration information element is reduced, thereby reducing signaling resources.

It should be noted herein that only differences from the foregoing embodiments are described correspondingly in FIG. 7 to FIG. 10. Therefore, the descriptions are relatively simple. For detailed content, refer to the foregoing embodiments, same or similar parts between the different embodiments, reference may be made between the embodiments.

The present invention is further described below from the perspective of a wireless communications device, where the wireless communications device may be UE or a base station.

Figure 11:
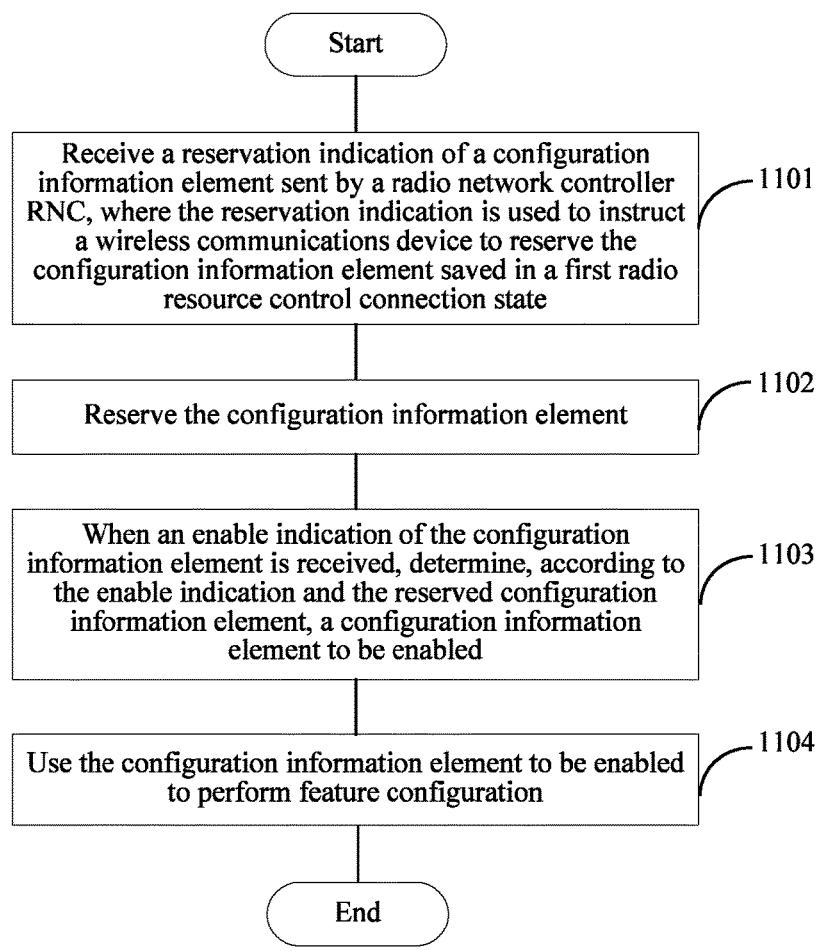
FIG. 11 is a flowchart of another embodiment of a feature configuration method according to some embodiments.

Referring to FIG. 11, FIG. 11 is a schematic diagram of an embodiment of a feature configuration method according to some embodiments. The method in this embodiment may be performed by the wireless communications device. To enable a feature, the wireless communications device may use the method in this embodiment to perform feature configuration.

Step 1101: A wireless communications device receives a reservation indication of a configuration information element sent by an RNC, where the reservation indication is used to instruct the wireless communications device to reserve the configuration information element saved in a first radio resource control connection state.

The reservation indication may include a first bit string or reservation indications of more than one sub-configuration information element or a reservation identifier. For forms and effects of the first bit string, the reservation indication of the sub-configuration information element, and the reservation identifier, and a manner of determining a configuration information element according to the reservation indication of the configuration information element, refer to the embodiment in FIG. 1, and details are no longer described herein.

Step 1102: Reserve the configuration information element.

When a radio resource control connection state of the UE is transitioned, the wireless communications device reserves the configuration information element according to the reservation indication of the configuration information element instead of deleting the configuration information element, so that the configuration information element may be reused in a subsequent process to perform feature configuration.

Step 1103: When receiving an enable indication of the configuration information element, the wireless communications device determines, according to the enable indication of the configuration information element and the configuration information element reserved by the wireless communications device, a configuration information element to be enabled.

The enable indication may include a second bit string or an enable indication of at least one sub-configuration information element or an enable identifier. If the enable indication of the configuration information element includes a second bit string, a configuration information element corresponding to a bit, whose bit value is a specific value, in the second bit string is used as the configuration information element to be enabled. If the enable indication of the configuration information element includes an enable indication of a sub-configuration information element, a configuration information element indicated by an enable indication of each sub-configuration information element is used as the configuration information element to be enabled. If the enable indication of the configuration information element includes an enable identifier, all configuration information elements are used as configuration information elements to be enabled.

For a sending time and a sending manner of the enable indication of the configuration information element, refer to the embodiment in FIG. 1, and details are no longer described herein.

Step 1104: The wireless communications device uses the configuration information element to be enabled to perform feature configuration.

A manner of using the configuration information element to be enabled to perform feature configuration is similar to a method for using the configuration information element to perform feature configuration in the prior art, and is not described herein.

By means of this embodiment, a wireless communications device may reserve a configuration information element according to a reservation indication delivered by an RNC instead of deleting the configuration information element, and when the wireless communications device needs to be enable a feature, the configuration information element reserved by the wireless communications device may be used according to an enable indication of the configuration information element to perform configuration, so that transmission of a configuration information element is reduced, thereby reducing signaling resources.

Figure 12:
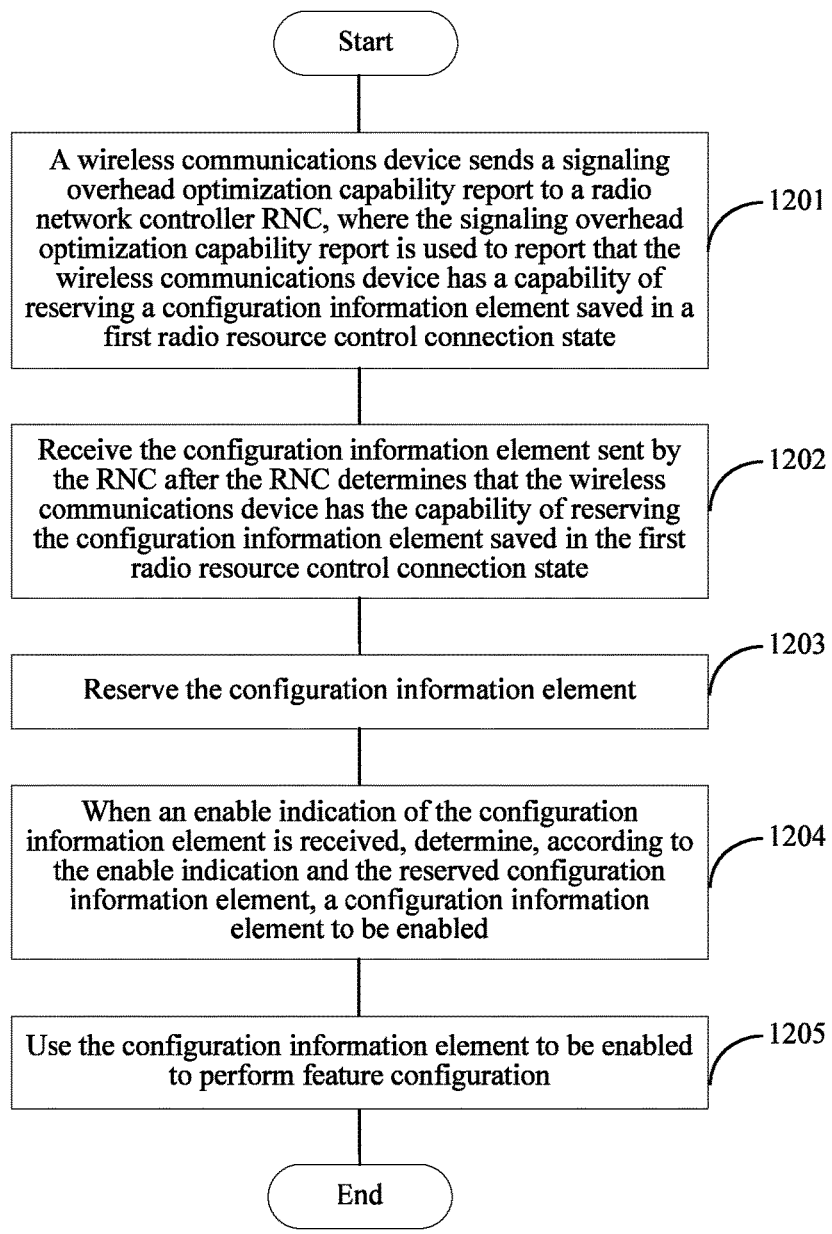
FIG. 12 is a flowchart of another embodiment of a feature configuration method according to some embodiments.

Referring to FIG. 12, FIG. 12 is a flowchart of an embodiment of a feature configuration method according to some embodiments. A wireless communications device in this embodiment may be UE or a base station. The method in this embodiment may be performed by the wireless communications device. To enable a feature, the wireless communications device may use the method in this embodiment to perform feature configuration.

Step 1201: A wireless communications device sends a signaling overhead optimization capability report to an RNC, where the signaling overhead optimization capability report is used to report that the wireless communications device has a capability of reserving a configuration information element saved in a first radio resource control connection state.

When the wireless communications device has the capability of reserving the configuration information element saved in the first radio resource control connection state, the wireless communications device reports the capability to the RNC.

Step 1202: Receive the configuration information element sent by the RNC.

After the RNC determines that the wireless communications device has the capability of reserving the configuration information element saved in the first radio resource control connection state, to reduce signaling overheads, the RNC may send the configuration information element to the wireless communications device.

Step 1203: Reserve the configuration information element.

When a radio resource control connection state of the UE is transitioned, the wireless communications device reserves the configuration information element according to the reservation indication of the configuration information element instead of deleting the configuration information element, so that the configuration information element may be reused in a subsequent process to perform feature configuration.

Step 1204: When the wireless communications device receives an enable indication of the configuration information element, the wireless communications device determines, respectively according to the enable indication of the configuration information element and the configuration information element reserved by the wireless communications device, a configuration information element to be enabled.

If the enable indication includes a second bit string, a configuration information element corresponding to a bit, whose bit value is a specific value, in the second bit string is used as the configuration information element to be enabled. If the enable indication includes an enable indication of a sub-configuration information element, a configuration information element indicated by an enable indication of each sub-configuration information element is used as the configuration information element to be enabled. If the enable indication includes an enable identifier, all configuration information elements are used as configuration information elements to be enabled.

For a sending time and a sending manner of the enable indication, refer to the embodiment in FIG. 1, and details are no longer described herein.

Step 1205: The wireless communications device uses the configuration information element to be enabled to perform feature configuration.

A manner of using, by the wireless communications device, the configuration information element to be enabled to perform feature configuration is similar to a method for using the configuration information element to perform feature configuration in the prior art, and is not described herein.

By means of this embodiment, a wireless communications device may reserve a configuration information element according to an indication of an RNC instead of deleting the configuration information element, and when the wireless communications device needs to enable a feature, the configuration information element reserved by the wireless communications device may be used according to an enable indication of the configuration information element to perform configuration, so that transmission of a configuration information element is reduced, thereby reducing signaling resources.

Figure 13:
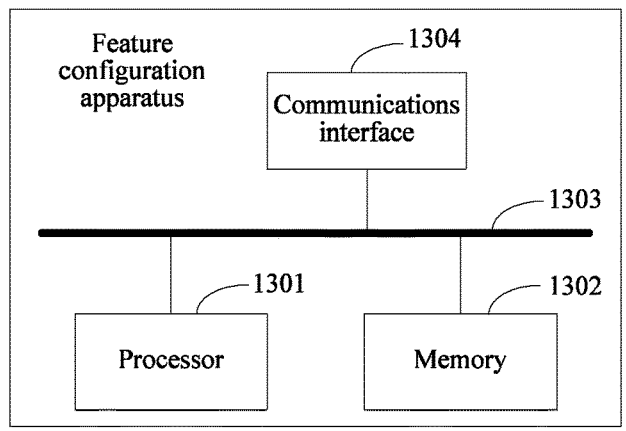
FIG. 13 is a schematic diagram of another embodiment of a feature configuration apparatus according to some embodiments.

FIG. 13 shows another embodiment of a feature configuration apparatus according to some embodiments. The apparatus may be an RNC or may be disposed on an RNC.

As shown in FIG. 13, the feature configuration apparatus includes modules such as a processor 1301, a memory 1302, and a communications interface 1304, and the modules are connected by using a bus 1303. The apparatus may be configured to execute the steps of the methods that are implemented by an RNC and that are in FIG. 5 and FIG. 7 to FIG. 10.

The bus 1303 may be a peripheral component interconnect (PCI) bus, an extended industry standard architecture (EISA) bus, or the like. The bus may be classified into an address bus, a data bus, a control bus, and the like. For ease of representation, the bus in FIG. 6 is represented by using only one bold line, but it does not indicate that there is only one bus or only one type of bus.

The memory 1302 is configured to store a program. Specifically, the program may include program code, and the program code includes a computer execution instruction. The memory 1302 may include a random access memory (RAM), and may further include a non-volatile memory, for example, at least one magnetic disk storage.

When the apparatus runs, the processor 1301 executes the computer execution instruction stored in the memory 1302, to enable the apparatus to execute the following method: sending a first reservation indication of a configuration information element to user equipment (UE), where the first reservation indication is used to instruct the UE to reserve the configuration information element saved in a first radio resource control connection state; and when the UE reenters the first radio resource control connection state, sending a first enable indication of the configuration information element to the UE, where the first enable indication is used to instruct the UE to use the configuration information element to perform feature configuration.

Figure 14:
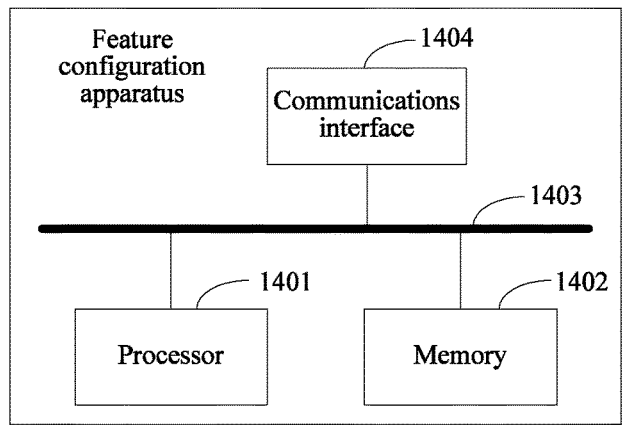
FIG. 14 is a schematic diagram of another embodiment of a feature configuration apparatus according to some embodiments.

FIG. 14 shows another embodiment of a feature configuration apparatus according to some embodiments. The apparatus may be an RNC or may be disposed on an RNC. The apparatus may be specifically configured to execute the steps in the embodiment shown in FIG. 6.

As shown in FIG. 14, the feature configuration apparatus includes modules such as a processor 1401, a memory 1402, and a communications interface 1404, and the modules are connected by using a bus 1403.

The bus 1403 may be a peripheral component interconnect (PCI) bus, an extended industry standard architecture (EISA) bus, or the like. The bus may be classified into an address bus, a data bus, a control bus, and the like. For ease of representation, the bus in FIG. 14 is represented by using only one bold line, but it does not indicate that there is only one bus or only one type of bus.

The memory 1402 is configured to store a program. Specifically, the program may include program code, and the program code includes a computer execution instruction. The memory 1402 may include a random access memory (RAM), and may further include a non-volatile memory, for example, at least one magnetic disk storage.

When the apparatus runs, the processor 1401 executes the computer execution instruction stored in the memory 1402, to enable the apparatus to execute the following method: receiving a first signaling overhead optimization capability report reported by user equipment (UE), where the first signaling overhead optimization capability report is used to report that the UE has a capability of reserving a configuration information element saved in a first radio resource control connection state; after the first signaling overhead optimization capability report is received, sending the configuration information element to the UE, so that the UE reserves the configuration information element when the UE leaves the first radio resource control connection state; and when the UE reenters the first radio resource control connection state, sending a first enable indication of the configuration information element, where the first enable indication is used to instruct the UE to use the configuration information element to perform feature configuration.

Figure 15:
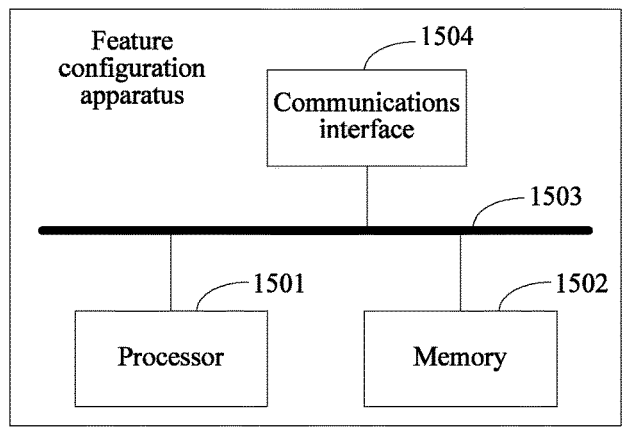
FIG. 15 is a schematic diagram of another embodiment of a feature configuration apparatus according to some embodiments.

FIG. 15 shows another embodiment of a feature configuration apparatus according to some embodiments. The apparatus may be disposed on UE or a base station. The apparatus may be configured to execute the steps in the embodiment shown in FIG. 11 or FIG. 12.

As shown in FIG. 15, the feature configuration apparatus includes modules such as a processor 1501, a memory 1502, and a communications interface 1504, and the modules are connected by using a bus 1503.

The bus 1503 may be a peripheral component interconnect (PCI) bus, an extended industry standard architecture (EISA) bus, or the like. The bus may be classified into an address bus, a data bus, a control bus, and the like. For ease of representation, the bus in FIG. 6 is represented by using only one bold line, but it does not indicate that there is only one bus or only one type of bus.

The memory 1502 is configured to store a program. Specifically, the program may include program code, and the program code includes a computer execution instruction. The memory 1502 may include a random access memory (RAM), and may further include a non-volatile memory, for example, at least one magnetic disk storage.

When the apparatus runs, the processor 1501 executes the computer execution instruction stored in the memory 1502, to enable the apparatus to execute the following method:

receiving a reservation indication of a configuration information element sent by a radio network controller (RNC), where the reservation indication is used to instruct a wireless communications device to reserve the configuration information element saved in a first radio resource control connection state; reserving the configuration information element; when an enable indication of the configuration information element is received, determining, according to the enable indication of the configuration information element and the configuration information element, a configuration information element to be enabled; and using the configuration information element to be enabled to perform feature configuration.

Figure 16:
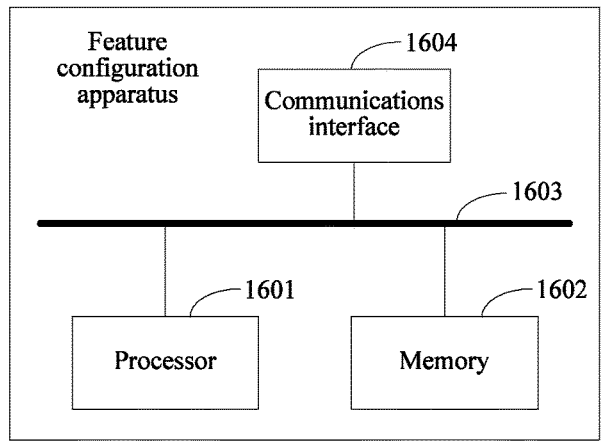
FIG. 16 is a schematic diagram of another embodiment of a feature configuration apparatus according to some embodiments.

FIG. 16 shows another embodiment of a feature configuration apparatus according to some embodiments. The apparatus may be disposed on UE or a base station. The apparatus may be configured to execute the steps in the embodiment shown in FIG. 11 or FIG. 12.

As shown in FIG. 16, the feature configuration apparatus includes modules such as a processor 1601, a memory 1602, and a communications interface 1604, and the modules are connected by using a bus 1603.

The bus 1603 may be a peripheral component interconnect (PCI) bus, an extended industry standard architecture (EISA) bus, or the like. The bus may be classified into an address bus, a data bus, a control bus, and the like. For ease of representation, the bus in FIG. 16 is represented by using only one bold line, but it does not indicate that there is only one bus or only one type of bus.

The memory 1602 is configured to store a program. Specifically, the program may include program code, and the program code includes a computer execution instruction. The memory 1602 may include a random access memory (RAM), and may further include a non-volatile memory, for example, at least one magnetic disk storage.

When the apparatus runs, the processor 1601 executes the computer execution instruction stored in the memory 1602, to enable the apparatus to execute the following method:

sending a signaling overhead optimization capability report to a radio network controller (RNC), where the signaling overhead optimization capability report is used to report that a wireless communications device has a capability of reserving a configuration information element saved in a first radio resource control connection state; receiving the configuration information element sent by the RNC after the RNC determines that the wireless communications device has the capability of reserving the configuration information element saved in the first radio resource control connection state; reserving the configuration information element; when an enable indication of the configuration information element is received, determining, according to the enable indication of the configuration information element and the configuration information element, a configuration information element to be enabled; and using the configuration information element to be enabled to perform feature configuration.

Figure 17:
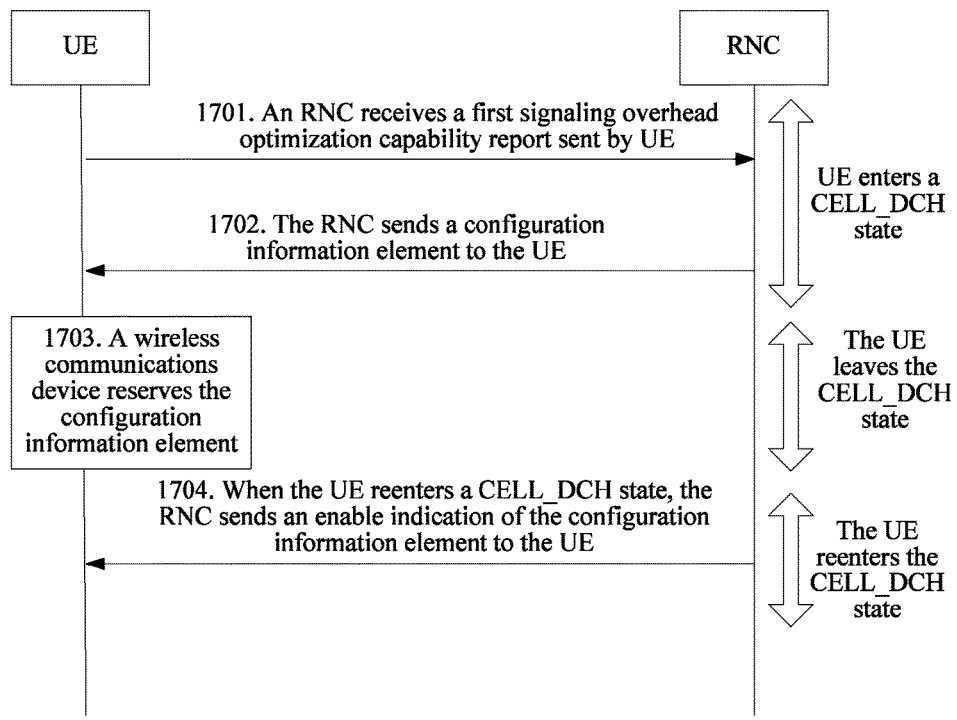
FIG. 17 is a flowchart of another embodiment of a feature configuration method according to some embodiments.

Referring to FIG. 17, FIG. 17 is a schematic diagram of another embodiment of a feature configuration method according to some embodiments. In this embodiment, a CELL_DCH state is used as an example to further describe the feature configuration method.

Step 1701: An RNC receives a first signaling overhead optimization capability report sent by UE.

The first signaling overhead optimization capability report is used to report that the UE has a capability of reserving a configuration information element saved in a first radio resource control connection state.

Step 1702: The RNC sends a configuration information element to the UE.

When the RNC determines, according to the signaling overhead optimization capability report, that the UE has a capability of reserving the configuration information element saved in a first radio resource control connection state, the UE sends the configuration information element to the UE, so that the UE saves the configuration information element.

Step 1703: When the UE leaves a CELL_DCH state, the UE reserves the configuration information element.

When a data transmission requirement of the UE is reduced, the RNC may use a manner such as physical channel reconfiguration to instruct the UE to perform state transition to leave the CELL_DCH state.

After state transition of the UE occurs, the RNC may instruct a base station to delete an established link.

Step 1704: When the UE reenters the CELL_DCH state, the RNC sends an enable indication of the configuration information element to the UE.

The enable indication is used to instruct the UE to use the configuration information element to perform feature configuration. For example, the controller sends a radio link setup message or a radio link reconfiguration message to the base station, where the radio link setup message or the radio link reconfiguration message carries the enable indication. For details of the enable indication, refer to the content described in the embodiment shown in FIG. 1, and details are no longer described herein.

When the UE reenters CELL_DCH state, a feature in CELL_DCH state usually needs to be activated again. Because the UE has reserved a configuration information element corresponding to a feature to be enabled, in this case, the RNC may use a manner of sending the enable indication of the configuration information element to instruct the UE to use the configuration information element to perform feature configuration instead of resending the configuration information element, thereby achieving an effect of reducing signaling resources.

Before the UE reenters the CELL_DCH state, the RNC may first instruct the base station to perform link setup again. A specific process of link setup is no longer described herein.

It should be noted herein that, when the UE enables a feature, the base station may be involved to generate a feature parameter. Therefore, when the RNC discovers that a parameter of the configuration information element is inconsistent with the parameter generated by the base station, the RNC still needs to send a newly generated configuration information element to the UE, instead of sending the enable indication of the configuration information element to the UE.

By means of this embodiment, UE may reserve, when the UE leaves a CELL_DCH state, a configuration information element sent by an RNC, and when the UE reenters the CELL_DCH state and needs to enable a feature, the RNC may perform configuration according to an enable indication and the reserved configuration information element, so that transmission of a configuration information element is reduced, thereby reducing signaling resources.

Figure 18:
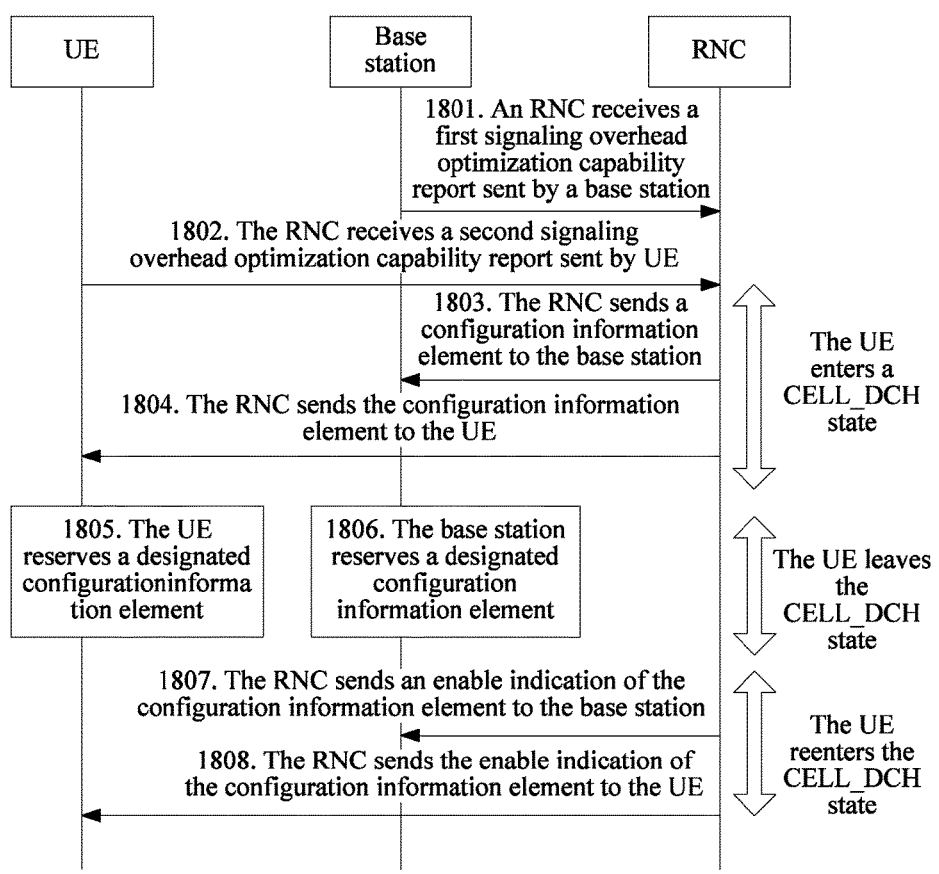
FIG. 18 is a flowchart of another embodiment of a feature configuration method according to some embodiments.

Referring to FIG. 18, FIG. 18 is a schematic diagram of another embodiment of a feature configuration method according to some embodiments. In this embodiment, a CELL_DCH state is used as an example to further describe the feature configuration method.

Step 1801: An RNC receives a first signaling overhead optimization capability report sent by a base station.

The first signaling overhead optimization capability report is used to report that the base station has a capability of reserving a configuration information element saved in a first radio resource control connection state.

Step 1802: The RNC receives a second signaling overhead optimization capability report sent by UE.

The second signaling overhead optimization capability report is used to report that the UE has a capability of reserving a configuration information element saved in a first radio resource control connection state.

Step 1803: The RNC sends a configuration information element to the base station.

When the RNC determines, according to the first signaling overhead optimization capability report, that the base station has the capability of reserving the configuration information element saved in the first radio resource control connection state, the RNC sends the configuration information element to the base station, so that the base station saves the configuration information element.

Step 1804: The RNC sends the configuration information element to the UE.

When the RNC determines, according to the second signaling overhead optimization capability report, that the UE has the capability of reserving the configuration information element saved in the first radio resource control connection state, the RNC sends the configuration information element to the UE, so that the UE saves the configuration information element.

Step 1805: When the UE leaves a CELL_DCH state, the UE reserves the configuration information element.

When a data transmission requirement of the UE is reduced, the RNC may use a manner such as physical channel reconfiguration to instruct the UE to perform state transition to leave the CELL_DCH state.

After state transition of the UE occurs, the RNC may instruct the base station to delete an established link.

Step 1806: The base station reserves the configuration information element.

Step 1807: When the UE reenters the CELL_DCH state, the RNC sends a second enable indication of the configuration information element to the base station.

The second enable indication is further used to instruct the base station to use the saved configuration information element to perform feature configuration. For example, the controller sends a radio link setup message or a radio link reconfiguration message to the base station, where the radio link setup message or the radio link reconfiguration message carries the enable indication of the configuration information element. For details of the second enable indication, refer to the content described in the embodiment shown in FIG. 1, and details are no longer described herein.

Step 1808: The RNC sends a first enable indication of the configuration information element to the UE.

The first enable indication is used to instruct the UE to use the reserved configuration information element in the CELL_DCH state to perform feature configuration. For example, the controller sends a radio bearer setup message or a radio bearer reconfiguration message to the user equipment, where the radio bearer setup message or the radio bearer reconfiguration message carries the first enable indication of the configuration information element. For details of the first enable indication, refer to the content described in the embodiment shown in FIG. 1, and details are no longer described herein.

The first enable indication and the second enable indication may have a same form and a same content setting.

When the UE reenters CELL_DCH state, a feature in CELL_DCH state usually needs to be activated again. Because the UE has reserved a configuration information element corresponding to a feature to be enabled, in this case, the RNC may use a manner of sending the enable indication of the configuration information element to instruct the UE to use the configuration information element to perform feature configuration instead of resending the configuration information element, thereby achieving an effect of reducing signaling resources.

By means of this embodiment, UE may reserve, when the UE leaves a CELL_DCH state, a configuration information element sent by an RNC, and when the UE and a base station reenter the CELL_DCH state and need to enable a feature, the RNC may respectively instruct, by using a first enable indication and a second enable indication, the UE and the base station to use the reserved configuration information element to perform configuration, so that transmission of a configuration information element is reduced, thereby reducing signaling resources.

It should be noted that sequences of steps in the foregoing method embodiments are only exemplary descriptions, and do not constitute any limitation.

In specific implementation, the present invention further provides a computer storage medium. The computer storage medium may store a program. When the program is executed, some or all steps in embodiments of feature configuration method provided in the present invention may be included. The storage medium may be: a magnetic disk, an optical disc, a read-only memory (ROM), a random access memory (RAM), or the like.

A person skilled in the art may clearly understand that the present invention may be implemented by software in addition to a necessary universal hardware platform. Based on such an understanding, the technical solutions essentially or the part contributing to the prior art may be implemented in a form of a software product. The software product is stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments.

In this specification, the embodiments are described in a progressive manner. Reference may be made to each other for a same or similar part of the embodiments. Each embodiment focuses on a difference from other embodiments. Especially, the apparatus, server, and system embodiments are basically similar to the method embodiments, and therefore are briefly described. For a relevant part, reference may be made to the description in the part of the method embodiments. The foregoing descriptions are implementation manners, but are not intended to limit the protection scope. Any modification, equivalent replacement, or improvement made without departing from the presented principles shall fall within the protection scope of the present invention.

What is claimed is:

1. A feature configuration apparatus, comprising:
  a transmitter;
  a processor; and
  a non-transitory computer-readable storage medium storing a program to be executed by the processor, the program including instructions to:
  cause the transmitter to send a first reservation indication of a configuration information element to user equipment (UE), wherein the first reservation indication instructs the UE to reserve the configuration information element saved in a first radio resource control connection state; and
  cause the transmitter to, when the UE reenters the first radio resource control connection state, send a first enable indication of the configuration information element to the UE, wherein the first enable indication instructs the UE to use the configuration information element to perform feature configuration.

2. The apparatus according to claim 1, wherein the program further includes instructions to send at least one of the the first reservation indication or the first enable indication to the UE by using at least one of a radio bearer setup message or a radio bearer reconfiguration message.

3. The apparatus according to claim 1, wherein the first reservation indication comprises at least one of:
  a second bit string, wherein each bit in the second bit string corresponds to one configuration information element saved in the first radio resource control connection state, and wherein a value of a bit represents whether a configuration information element corresponding to the bit needs to be reserved;
  reservation indications of one or more sub-configuration information elements, and a reservation indication of each sub-configuration information element corresponds to one configuration information element that needs to be reserved; or
  a reservation identifier, and the reservation identifier represents that all the saved configuration information elements need to be reserved.

4. The apparatus according to claim 1, further comprising a receiver, wherein program further includes instructions to receive, through the receiver, a first signaling overhead optimization capability report from the UE, wherein the first signaling overhead optimization capability report that reports that the UE has a capability of reserving the configuration information element saved in the first radio resource control connection state.

5. The apparatus according to claim 1, wherein the first enable indication comprises at least one of:
  a fourth bit string, wherein each bit in the fourth bit string corresponds to one configuration information element, and wherein a value of each bit represents whether the saved configuration information element corresponding to the bit needs to be used to perform feature configuration;
  enable indications of one or more sub-configuration information elements, wherein an enable indication of each sub-configuration information element corresponds to one configuration information element, and represents that the configuration information element corresponding to the enable indication of the sub-configuration information element needs to be used to perform feature configuration; or
  an enable identifier, wherein the enable identifier represents that all the reserved configuration information elements need to be used to perform feature configuration.

6. The apparatus according to claim 1, wherein the first radio resource control connection state at least one one of a cell_dedicated channel (CELL_DCH) state, a cell_paging channel (CELL_PCH) state, a cell_forward access channel (CELL_FACH) state, or a UTRAN registration area paging channel (URA_PCH) state.

7. A feature configuration apparatus, comprising:
  a receiver, configured to receive a first signaling overhead optimization capability report from a user equipment (UE), wherein the first signaling overhead optimization capability report reports that the UE has a capability of reserving a configuration information element saved in a first radio resource control connection state;
  a transmitter, configured to send the configuration information element to the UE for reserving the configuration information element when leaving the first radio resource control connection state, wherein the transmitter is further configured to send, when the UE reenters the first radio resource control connection state, a first enable indication of the configuration information element to the UE, wherein the first enable indication instructs the UE to use the configuration information element to perform feature configuration.

8. The apparatus according to claim 7, wherein the first enable indication comprises at least one of:
  a second bit string, wherein each bit in the second bit string corresponds to one configuration information element, and wherein a value of each bit represents whether the saved configuration information element corresponding to the bit needs to be used to perform feature configuration;
  enable indications of one or more sub-configuration information elements, wherein an enable indication of each sub-configuration information element corresponds to one configuration information element, and represents that a saved configuration information element corresponding to the enable indication of the sub-configuration information element needs to be used to perform feature configuration; or
an enable identifier, wherein the enable identifier represents that all the reserved configuration information elements need to be used to perform feature configuration.

9. A feature configuration apparatus, comprising:
a receiver, configured to receive a reservation indication of a configuration information element and an enable indication of the configuration information element, wherein the reservation indication and the enable indication are sent by a radio network controller (RNC), the reservation indication instructs a wireless communications device to reserve the configuration information element saved in a first radio resource control connection state, and the enable indication instructs the wireless communications device to use the configuration information element to perform feature configuration, wherein the receiver is further configured to receive the configuration information element;
a processor; and
a non-transitory computer-readable storage medium storing a program to be executed by the processor, the program including instructions to:
reserve the configuration information element;
determine, when the enable indication is received and according to the enable indication and the reserved configuration information element, a configuration information element to be enabled; and
use the configuration information element that is to be enabled to perform feature configuration.

10. The apparatus according to claim 9, wherein the reservation indication comprises at least one of a first bit string, wherein each bit in the first bit string corresponds to one configuration information element saved in the first radio resource control connection state, and wherein a value of a bit represents whether a configuration information element corresponding to the bit needs to be reserved;
reservation indications of one or more sub-configuration information elements, wherein a reservation indication of each sub-configuration information element corresponds to one configuration information element that needs to be reserved; or
a reservation identifier, wherein the reservation identifier represents that all the saved configuration information elements need to be reserved.

11. The apparatus according to claim 9, wherein the program including instructions to perform at least one of:
using, when the enable indication comprises a second bit string, a configuration information element corresponding to a bit, whose bit value is a specific value, in the second bit string as the configuration information element to be enabled;
using, when the enable indication comprises an enable indication of a sub-configuration information element, as the configuration information element to be enabled, a configuration information element indicated by an enable indication of each sub-configuration information element; and
using, when the enable indication comprises an enable identifier, as the configuration information element to be enabled, all the configuration information elements that are reserved by the wireless communications device in the first radio resource control connection state.

12. A feature configuration apparatus, comprising:
a transmitter, configured to send a signaling overhead optimization capability report to a radio network controller (RNC), wherein the signaling overhead optimization capability report reports that a wireless communications device has a capability of reserving a configuration information element saved in a first radio resource control connection state;
a receiver, configured to receive the configuration information element sent by the RNC;
a processor; and
a non-transitory computer-readable storage medium storing a program to be executed by the processor, the program including instructions to:
reserve the configuration information element, wherein the receiver is further configured to receive an enable indication of the configuration information element sent by the RNC;
determine, when the receiver receives the enable indication, according to the enable indication and the reserved configuration information element, a configuration information element to be enabled; and
use the configuration information element that is to be enabled to perform feature configuration.

13. The apparatus according to claim 12, wherein the program including instructions to perform at least one of:
using, when the enable indication comprises a second bit string, a configuration information element corresponding to a bit, whose bit value is a specific value, in the second bit string as the configuration information element to be enabled;
using, when the enable indication comprises an enable indication of a sub-configuration information element, as the configuration information element to be enabled, a configuration information element indicated by an enable indication of each sub-configuration information element; and
using, when the enable indication comprises an enable identifier, as the configuration information element to be enabled, all the configuration information elements that are reserved by the wireless communications device in the first radio resource control connection state.

14. A feature configuration method, comprising:
sending, by a radio network controller (RNC), a first reservation indication of a configuration information element to user equipment (UE), wherein the first reservation indication instructs the UE to reserve the configuration information element saved in a first radio resource control connection state; and
sending, by the RNC when the UE reenters the first radio resource control connection state, a first enable indication of the configuration information element to the UE, wherein the first enable indication instructs the UE to use the saved configuration information element to perform feature configuration.

15. The method according to claim 14, wherein the RNC sends at least one of the first reservation indication or the first enable indication to the UE by using at least one of a radio bearer setup message or a radio bearer reconfiguration message.

16. The method according to claim 14, wherein the first reservation indication comprises at least one of:
a second bit string, wherein each bit in the second bit string corresponds to one configuration information element saved in the first radio resource control connection state, and wherein a value of a bit represents whether a configuration information element corresponding to the bit needs to be reserved;

reservation indications of one or more sub-configuration information elements, and wherein a reservation indication of each sub-configuration information element corresponds to one configuration information element that needs to be reserved; or a reservation identifier, and wherein the reservation identifier represents that all the saved configuration information elements need to be reserved.

17. The method according to claim 14, further comprising:

receiving, by the radio network controller and before the sending, by the RNC, the first reservation indication of the configuration information element to the UE, a first signaling overhead optimization capability report reported by the UE, wherein the first signaling overhead optimization capability report reports that the UE has a capability of reserving the configuration information element saved in the first radio resource control connection state.

18. The method according to claim 14, wherein the first enable indication comprises at least one of:

a fourth bit string, wherein each bit in the fourth bit string corresponds to one configuration information element, and wherein a value of each bit represents whether the saved configuration information element corresponding to the bit needs to be used to perform feature configuration;

enable indications of one or more sub-configuration information elements, wherein an enable indication of each sub-configuration information element corresponds to one configuration information element, and wherein represents that the configuration information element corresponding to the enable indication of the sub-configuration information element needs to be used to perform feature configuration; or an enable identifier, and wherein the enable identifier represents that all the reserved configuration information elements need to be used to perform feature configuration.

19. The method according to claim 14, wherein the first radio resource control connection state is at least one of a cell_dedicated channel (CELL_DCH) state, a cell_paging channel (CELL_PCH) state, a cell_forward access channel (CELL_FACH) state, or a UTRAN registration area paging channel (URA_PCH) state.

20. A feature configuration method, comprising:

receiving, by a radio network controller (RNC), a first signaling overhead optimization capability report reported by user equipment (UE), wherein the first signaling overhead optimization capability report reports that the UE has a capability of reserving a configuration information element saved in a first radio resource control connection state;

sending, by the RNC after receiving the first signaling overhead optimization capability report, the configuration information element to the UE for reserving the configuration information element when leaving the first radio resource control connection state; and sending, by the RNC when the UE reenters the first radio resource control connection state, a first enable indication of the configuration information element to the UE, wherein the first enable indication instructs the UE to use the configuration information element to perform feature configuration.

* * * * *